(12) United States Patent
Nakamura

(10) Patent No.: US 10,477,042 B2
(45) Date of Patent: *Nov. 12, 2019

(54) COMMUNICATION APPARATUS AND COMMUNICATION SYSTEM

(71) Applicant: Brother Kogyo Kabushiki Kaisha, Nagoya-shi, Aichi-ken (JP)

(72) Inventor: Mitsuru Nakamura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,354

(22) Filed: Jan. 29, 2019

(65) Prior Publication Data
US 2019/0158687 A1 May 23, 2019

Related U.S. Application Data

(63) Continuation of application No. 14/036,096, filed on Sep. 25, 2013, now Pat. No. 10,200,549.

(30) Foreign Application Priority Data

Dec. 17, 2012 (JP) ................................. 2012-274473

(51) Int. Cl.
*B29C 64/393* (2017.01)
*H04N 1/00* (2006.01)
(Continued)

(52) U.S. Cl.
CPC ....... *H04N 1/00315* (2013.01); *G06F 3/1203* (2013.01); *G06F 3/1204* (2013.01);
(Continued)

(58) Field of Classification Search
CPC ... H04N 1/00315; H04W 4/80; G06F 3/1276; G06F 3/1286; G06F 3/1203;
(Continued)

(56) References Cited

U.S. PATENT DOCUMENTS

2004/0081479 A1  4/2004 Kobayashi et al.
2006/0171734 A1  8/2006 Maeda
(Continued)

FOREIGN PATENT DOCUMENTS

CN  101253469 A  8/2008
JP  2003337505 A  11/2003
(Continued)

OTHER PUBLICATIONS

Jun. 4, 2014—(EP) Extended Search Report—App 13185401.0.
(Continued)

*Primary Examiner* — Bharatkumar S Shah
(74) *Attorney, Agent, or Firm* — Banner & Witcoff, Ltd.

(57) ABSTRACT

A communication apparatus includes: a first type communication unit configured to perform communication with a portable device in a near field communication mode; a display unit; and a control device configured to perform: a receiving process of receiving a radio wave for connection with the portable device in the near field communication mode, from the portable device through the first type communication unit; and a display process of controlling the display unit to display a notice for prompting a user to perform operation for permitting the portable device to transmit information to the communication apparatus in the near field communication mode, in response to receipt of the radio wave in the receiving process.

14 Claims, 16 Drawing Sheets

(51) Int. Cl.
*H04W 4/80* (2018.01)
*G06F 3/12* (2006.01)
*H04B 5/00* (2006.01)
*H04L 29/08* (2006.01)

(52) U.S. Cl.
CPC .......... *G06F 3/1236* (2013.01); *G06F 3/1276* (2013.01); *G06F 3/1286* (2013.01); *G06F 3/1292* (2013.01); *H04B 5/0031* (2013.01); *H04W 4/80* (2018.02); *H04L 67/125* (2013.01)

(58) Field of Classification Search
CPC .... G06F 3/1292; G06F 3/1204; G06F 3/1236; H04B 5/0031; H04L 67/125
USPC ......................................................... 358/1.13
See application file for complete search history.

(56) References Cited

U.S. PATENT DOCUMENTS

| | | | |
|---|---|---|---|
| 2007/0201081 A1 | 8/2007 | Murayama | |
| 2009/0103124 A1 | 4/2009 | Kimura et al. | |
| 2009/0316206 A1 | 12/2009 | Anezaki et al. | |
| 2009/0318206 A1* | 12/2009 | Wardlow | A63F 9/24 463/1 |
| 2010/0081385 A1* | 4/2010 | Lin | H04M 1/7253 455/41.3 |
| 2010/0177049 A1 | 7/2010 | Levy et al. | |
| 2010/0188695 A1 | 7/2010 | Okigami | |
| 2010/0188698 A1 | 7/2010 | Koizumi | |
| 2011/0043857 A1 | 2/2011 | Hiroki | |
| 2011/0053641 A1 | 3/2011 | Lee et al. | |
| 2011/0286028 A1 | 11/2011 | Kinouchi et al. | |
| 2011/0296217 A1 | 12/2011 | Nishimura et al. | |
| 2012/0077433 A1* | 3/2012 | Walker | H04M 1/7253 455/41.1 |
| 2012/0083222 A1 | 4/2012 | Kawashimo | |
| 2013/0070297 A1* | 3/2013 | Kato | H04N 1/00217 358/1.15 |
| 2013/0155450 A1 | 6/2013 | Higashikawa | |
| 2014/0135036 A1 | 5/2014 | Bonanni et al. | |

FOREIGN PATENT DOCUMENTS

| | | |
|---|---|---|
| JP | 2007079639 A | 3/2007 |
| JP | 2007-166538 A | 6/2007 |
| JP | 2008-135959 A | 6/2008 |
| JP | 2009-251823 A | 10/2009 |
| JP | 2010177947 A | 8/2010 |
| JP | 2011253311 A | 12/2011 |
| JP | 2012-064030 A | 3/2012 |
| JP | 2012050119 A | 3/2012 |
| JP | 2012080289 A | 4/2012 |

OTHER PUBLICATIONS

Oct. 3, 2014—U.S. Notice of Allowance and Fee(s) Due—U.S. Appl. No. 14/178,387.
Nov. 24, 2015—(JP) Office Action—App 2012-274473.
Aug. 2, 2016—(CN) Office Action—App—201310459664.
Jul. 14, 2016—(EP) Office Action—App 13185401.0.

* cited by examiner

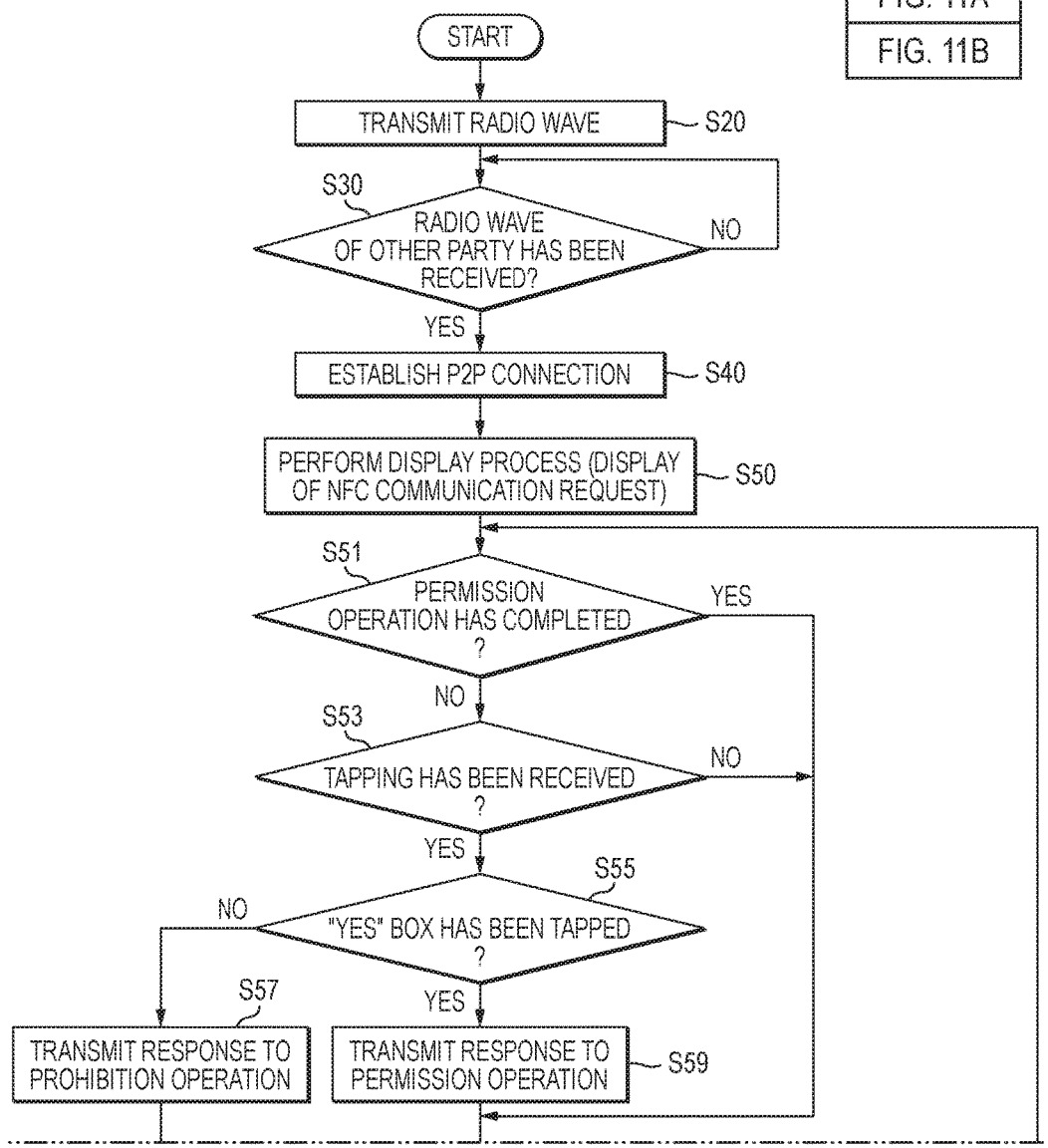

SECOND EXAMPLES OF SCREEN OF MULTI-FUNCTION DEVICE

SCREEN 4

P2P detection has succeeded.
Do you allow WiFi direct
connection according to NFC
to be established?
Please tap the portable device.

YES ⋯ Tap 1 time
no ⋯ Tap 2 times

SCREEN 2

WiFi direct connection starts.
Portable device can be
separated from the multi-
function device.

COMMUNICATION APPARATUS AND COMMUNICATION SYSTEM

CROSS-REFERENCE TO RELATED APPLICATIONS

This application is a continuation of prior U.S. application Ser. No. 14/036,096, filed on Sep. 25, 2013, which claims priority from Japanese Patent Application No. 2012-274473 filed on Dec. 17, 2012, the entire subject matter of which is incorporated herein by reference.

TECHNICAL FIELD

The present invention relates to a technology for using near field communication to transmit information between a portable device and a communication apparatus.

BACKGROUND

There has been proposed a technology for using near field communication to transmit information between two communication apparatuses, thereby establishing a high-speed wireless communication connection such as a wireless LAN.

SUMMARY

In a case of using near field communication to transmit information, it may be necessary to perform operation for permitting transmitting information on a user side. However, it has not been sufficiently considered how to display screen for notifying a user of a necessity of this operation.

Therefore, illustrative aspects of the present invention provide a technology for facilitating a user to recognize necessity of operation for permitting transmitting information by use of near field communication.

According to one illustrative aspect of the invention, there is provided a communication apparatus comprising: a first type communication unit configured to perform communication with a portable device in a near field communication mode; a display unit; and a control device. The control device is configured to perform: a receiving process of receiving a radio wave for connection with the portable device in the near field communication mode, from the portable device through the first type communication unit; and a display process of controlling the display unit to display a notice for prompting a user to perform operation for permitting the portable device to transmit information to the communication apparatus in the near field communication mode, in response to receipt of the radio wave in the receiving process.

In this configuration, the notice for prompting the user to perform operation for permitting the portable device to transmit information in a near field communication mode is displayed on the communication apparatus side. Therefore, it is possible to confirm that the operation for permitting transmitting information is necessary and that a timing to perform the operation has come, not only on the portable device side but also the communication apparatus side. From the above, it is easy for the user to recognize that the operation for permitting transmitting information is necessary.

Incidentally, the communication apparatus disclosed in this specification can be applied to a communication apparatus system including a portable device and a communication apparatus.

In the communication apparatus and the communication system disclosed in this specification, the notice for prompting the user to perform the operation for permitting the portable device to transmit information to the communication apparatus in a near field communication mode is displayed on the communication apparatus side. For this reason, it is possible to confirm that the operation for permitting transmitting information is necessary and that a timing to perform the operation has come, not only on the portable device side but also on the communication apparatus side. Therefore, it is easy for the user to recognize that the operation for permitting transmitting information is necessary.

BRIEF DESCRIPTION OF THE DRAWINGS

FIGS. 11A and 11B are flow charts illustrating the flow of a process which is performed on the multi-function device side in the printing process;

DETAILED DESCRIPTION

First Exemplary Embodiment

A first exemplary embodiment of the present invention will be described with reference to FIGS. 1 to 7.

Figure 1:
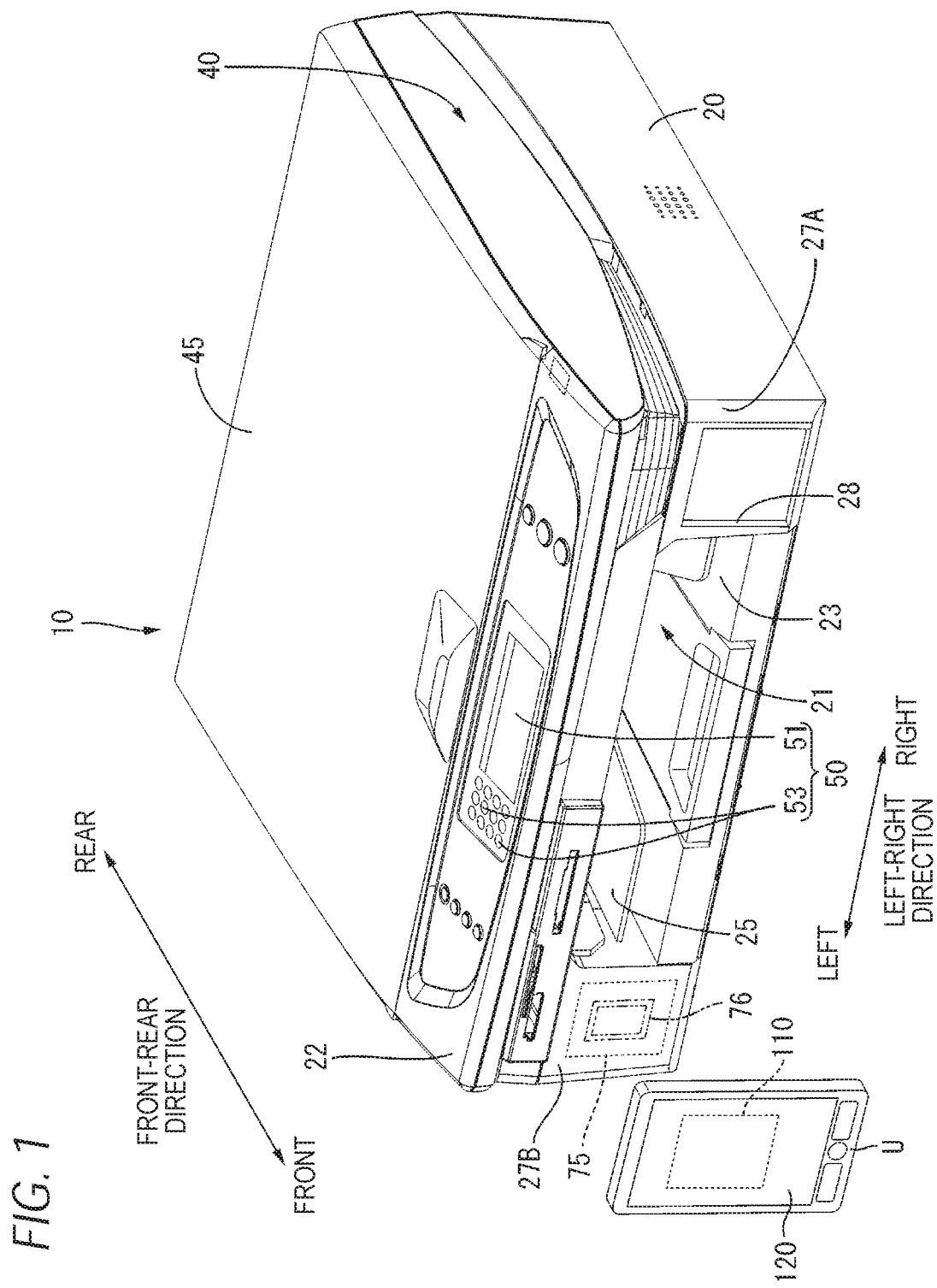
FIG. 1 is a perspective view illustrating a multi-function device according to a first exemplary embodiment.
Figure 2:
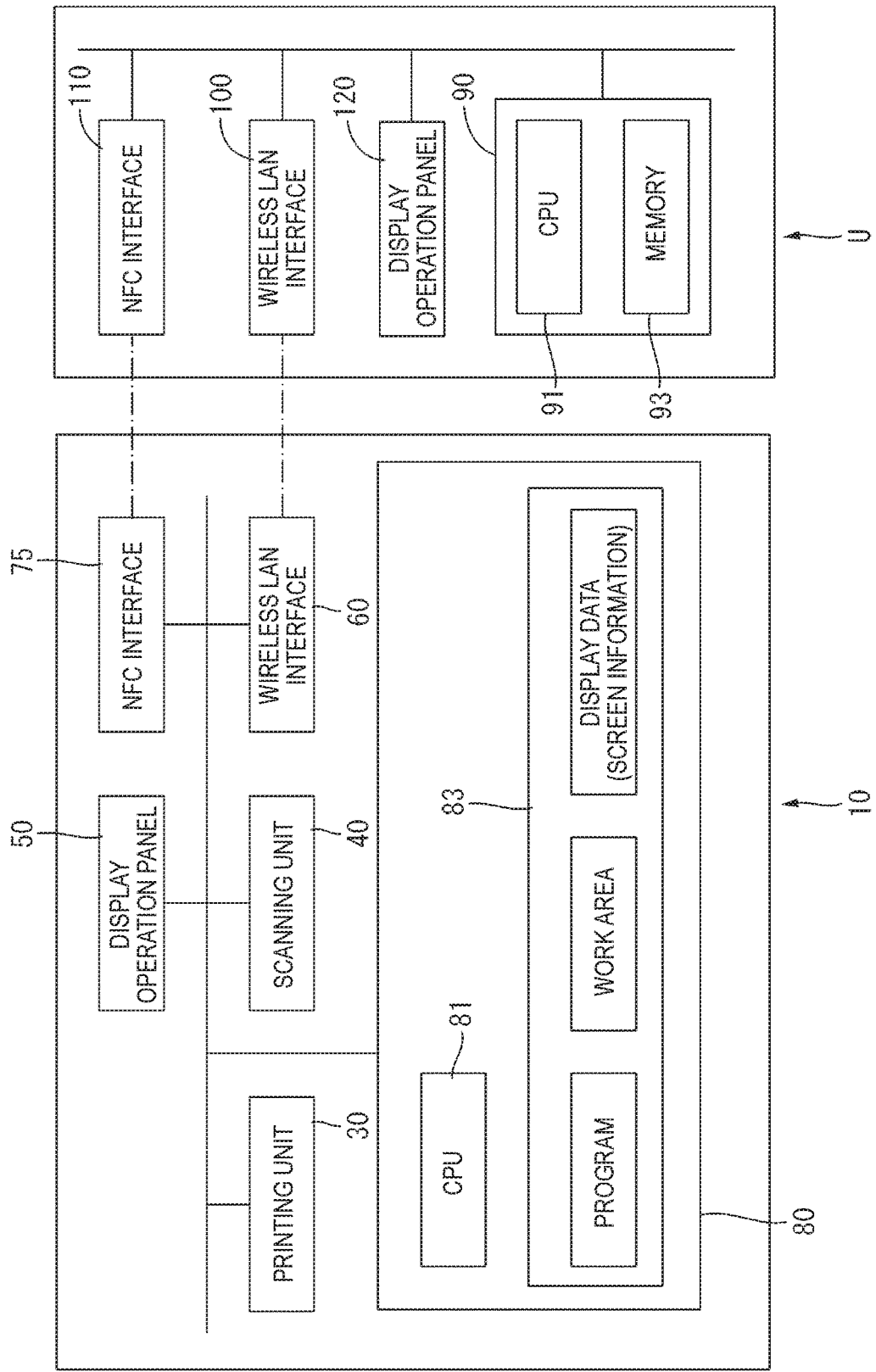
FIG. 2 is a block diagram illustrating electrical configurations of a portable device and the multi-function device.

FIG. 1 is a perspective view illustrating a multi-function device 10 according to the first exemplary embodiment. FIG. 2 is a block diagram illustrating the electrical configurations of the multi-function device and a portable device. The multi-function device 10 is an example of a communication apparatus of the present invention. The multi-function device 10 has a communication function, a scanning function, and a printing function.

1. Configurations of Multi-Function Device 10 and Portable Device U

The multi-function device 10 includes a main case body 20 and a flatbed type scanning unit 40 which is disposed at the upper side of the main case body 20. The main case body 20 has substantially a box shape and accommodates components configuring an inkjet type printing unit 30.

The scanning unit 40 includes a reading device (not shown) such as a CCD or a CIS, platen glass (not shown), and a document cover 45. After the document cover 45 is opened and a document is put on the platen glass, it is possible to read an image of a document sheet by moving the reading device in the left-right direction of the multi-function device 10.

Further, the multi-function device 10 includes a display operation panel (an example of a display unit of the present invention) 50 that is disposed on a top wall 22 of the front side. The display operation panel 50 includes a liquid crystal display unit 51 and a touch panel 53 (an example of an operation unit of the present invention) and is configured such that it is possible to perform a variety of input operation by operating the touch panel 53 while watching display of the liquid crystal display unit 51. Incidentally, the liquid crystal display unit 51 and the touch panel 53 overlap in the thickness direction of the panel, such that a substantially entire range of the panel can be used as a display screen and tapping (input operation) is possible. According thereto, a configuration of the present invention in which the display unit (in the present exemplary embodiment, the whole of the display operation panel 50 including the liquid crystal display unit 51) includes the operation unit (in the present exemplary embodiment, the touch panel 53) is implemented.

At the lower center of the main case body 20, a tray storage unit 21 is formed to pass therethrough in the front-rear direction, and a feeding tray 23 is removably fit from the front side into the tray storage unit 21. After a sheet fed from the feeding tray 23 is sent to the rear side of the multi-function device, the sheet is inverted 180 degrees and is sent to the front side of the multi-function device. Then, in the process of conveying the sheet to the front side, printing is performed by the printing unit 30, and the printed sheet is discharged onto a sheet discharge tray 25 provided above the feeding tray 23.

Further, as shown in FIG. 1, at a right end portion 27A of a front wall 27 of the main case body 20, an installation/removal opening 28 is formed for installing and removing ink cartridges such that it is possible to install and remove each ink cartridge through the installation/removal opening 28.

Further, on the rear surface side of a left end portion 27B of the front wall 27 of the main case body 20 which is the opposite side to the installation/removal opening 28, a near field communication (NFC) module 75 is attached. The NFC module 75 is configured to perform communication with the portable device U in a near field communication mode (hereinafter, referred to as a "NFC mode"). The NFC module 75 includes a loop antenna 76 and a communication circuit (not shown). Incidentally, the NFC module 75 is an example of a first type communication unit of the present invention, and functions as an NFC interface.

Subsequently, the electrical configurations of the portable device U and the multi-function device 10 will be described with reference to FIG. 2.

The portable device U is a mobile phone (for example, a smart phone), for example. The portable device U includes a terminal control unit 90, a wireless LAN interface 100, an NFC module 110, and a display operation panel 120.

The terminal control unit 90 includes a central processing unit (hereinafter, referred to as a "CPU") 91 and a memory 93. The memory 93 includes, for example, a ROM, a RAM, and so on. The ROM stores an OS and various programs such as a printing application program for controlling the multi-function device 10 such that a printing process is performed, and a reading application program for controlling the multi-function device 10 such that a scanner process is performed.

The CPU 91 controls each component of the portable device U according to programs read from the ROM. Incidentally, the application programs may be installed from a server provided by the vendor of the multi-function device 10 in the portable device U, or may be installed from a medium shipped together with the multi-function device 10 in the portable device U. The application programs may be installed in advance.

Via the wireless LAN interface 100, the terminal control unit 90 performs wireless communication according to a WiFi direct mode and wireless communication according to normal WiFi. In the WiFi direct mode, on the basis of 802.11 standards of IEEE (The Institute of Electrical and Electronics Engineers, Inc.) and standards based on the 802.11 standards (for example, 802.11a, 802.11b, 802.11g, 802.11n, and so on), wireless communication is performed.

Further, the wireless communication according to the WiFi direct mode is direct wireless communication which does not use any access point (not shown), and can be exclusively performed with a wireless apparatus corresponding one-to-one with the portable device U. In the wireless communication according to the WiFi direct mode, as long as the corresponding wireless communication connection is not disconnected, it is impossible to perform wireless communication with any other wireless apparatus. The wireless communication according to the normal WiFi is indirect wireless communication which uses an access point, and can be performed with multiple wireless apparatuses. Incidentally, the term "WiFi" is an abbreviation for wireless fidelity.

The NFC module 110 includes a loop antenna (not shown) and a communication circuit (not shown), like the NFC module 75 of the multi-function device (10) side, and is mounted on the rear surface side of the portable device U (a surface opposite to a surface on which the display operation panel 120 is provided). The NFC module 110 functions as an NFC interface which is used for the terminal control unit 90 to perform communication according to a NFC mode. Incidentally, the communication according to the NFC mode is performed on the basis of international standards of ISO/IEC 2148 or ISO/IEC 18092.

Further, the NFC mode is different from a WiFi mode such as the WiFi direct mode or the normal WiFi mode in wireless communication method, and the communication speed of the WiFi mode is higher than the communication speed of the NFC mode. Further, a communication range of the WiFi mode is longer than the communication range of the NFC mode.

The display operation panel 120 includes a touch panel to enable the user to perform a variety of input operation. The display operation panel 120 includes a liquid crystal display to be able to display various setting screens, the operating state of the portable device, and so on.

The multi-function device 10 includes a control unit (one example of a control device) 80, a wireless LAN interface 60, the NFC module 75, the display operation panel 50, the printing unit 30, and the scanning unit 40. The printing unit 30 is an example of a printing unit of the present invention, and is for printing images onto recording sheets. The scanning unit 40 is for reading images of document sheets.

The wireless LAN interface 60 is an example of a second type communication unit of the present invention, and is an interface which is used for the control unit 80 to perform communication according to the WiFi mode. The NFC module 75 is an interface which is used for the control unit 80 to perform communication according to the NFC mode.

The control unit 80 includes a CPU 81 and a memory 83. The memory 83 is configured by a ROM, a RAM, a hard disk, and so on. The memory 83 stores programs to be executed by the CPU 81, and display data of display images to be displayed on the display operation panel 50, specifically, a screen 1 of FIG. 5 and a screen 2 of FIG. 5. The CPU 81 is configured to perform various processes according to the programs stored in the memory 83. The CPU 81 performs processes according to the programs, whereby a printing process of the printing unit 30, an image reading process of the scanning unit 40, a communication process with the portable device U through the interfaces 60 and 70, and a display process of the display operation panel 50 are implemented.

2. Printing Process from Portable Device U Using Multi-Function Device 10

Figure 3:
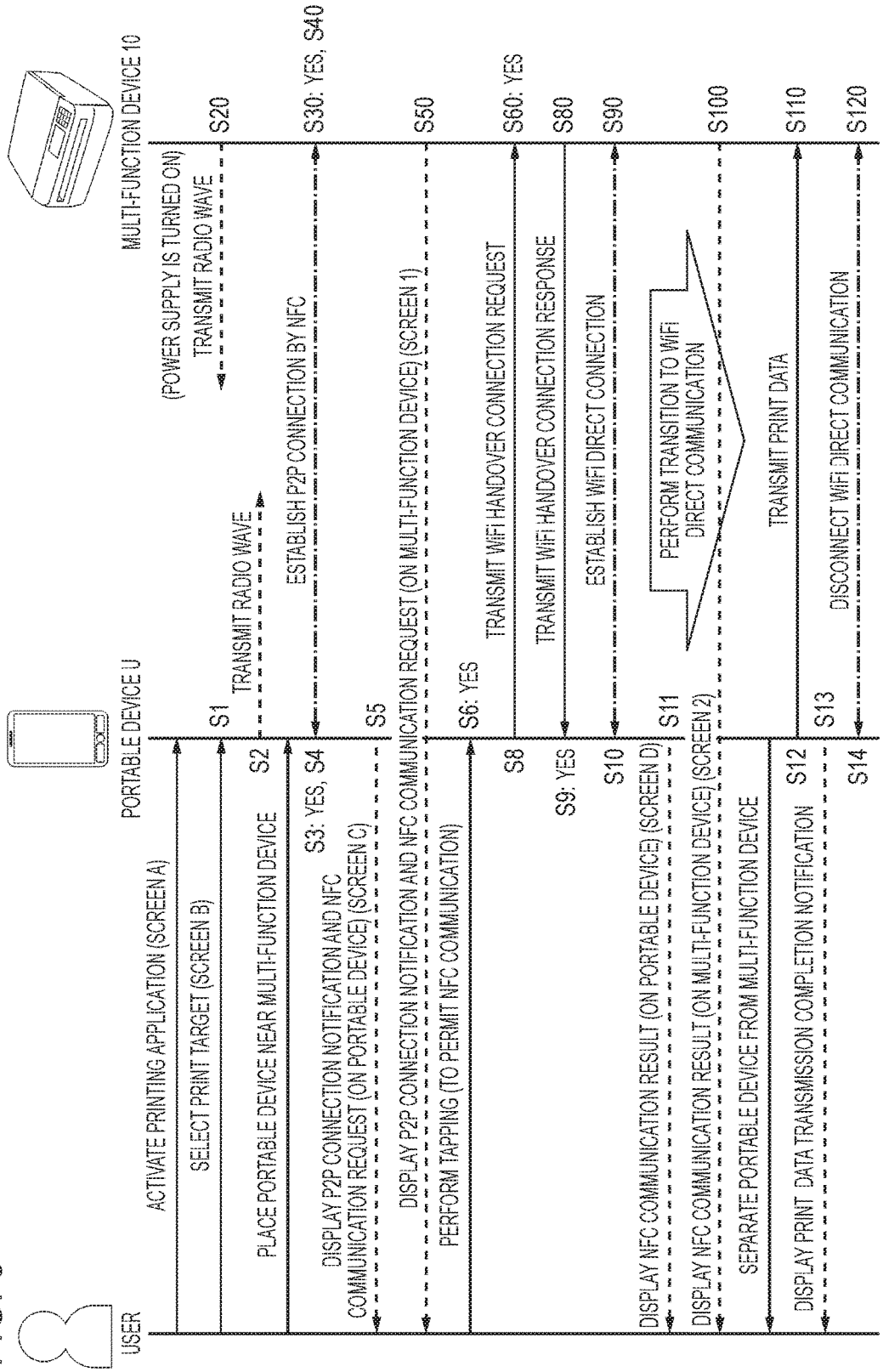
FIG. 3 is a sequence diagram illustrating a flow of a printing process.

FIG. 3 is a sequence diagram illustrating the flow of a printing process which is performed between the portable device U and the multi-function device 10. Incidentally, in the following description, the term "P2P (Peer to Peer)" means physically connecting a plurality of communication apparatuses (in the present exemplary embodiment, the portable device U and the multi-function device 10) on a one-to-one basis. The term "P2P connection notification" means notifying a user that physical connection has been established in a P2P manner. Further, the term "NFC communication request" means a request for requesting a permission to transmit a variety of information (information and settings of the portable device, print data, and so on) from the portable device U to the multi-function device 10 by communication according to the NFC mode. In the present exemplary embodiment, the term "handover" means performing pairing (mutual authentication to prevent connection with an unrelated apparatus) by the NFC modules 75 and 110, thereby handing communication of comparatively large data such as print data over to the wireless LAN interfaces 60 and 110 capable of high-speed communication.

In a case of using the portable device U to access the multi-function device 10 and perform a printing process, when the user of the portable device U operates the display operation panel 120 to activate the printing application program (hereinafter, referred to as a printing application), the terminal control unit 90 of the portable device (U) side performs a process shown in FIG. 6. First, in STEP 51 of FIG. 3 or 6, preparation for printing such as selecting an image to be printed is performed on the portable device (U) side. Specifically, upon the printing application is activated, the terminal control unit 90 reads data of image from the memory 93 and controls the display operation panel 120 of the portable device U to display a thumbnail image (a screen A shown in FIG. 4).

The user can select an image to be printed, from among the displayed thumbnail image. Specifically, the user can select an image to be printed by tapping a portion of the display operation panel 120 corresponding to the image to be printed. When an image is selected, the terminal control unit 90 of the portable device U controls the display operation panel 120 such that the selected image is enlarged (a screen B shown in FIG. 4). With this, the preparation for printing finishes.

After the preparation for printing finishes, when a predetermined time elapses, the terminal control unit 90 controls the display operation panel 120 to reduce a size of the selected image and display the reduced selected image, and to display a message "PLEASE BRING THE PORTABLE DEVICE INTO CLOSE PROXIMITY WITH THE MULTI-FUNCTION DEVICE" in an area where the reduces selected image is not displayed. Then, in STEP S2 of FIG. 3 or 6, the terminal control unit 90 of the portable device U controls the NFC module 110 to transmit a radio wave (a signal for informing the other party of the existence of the portable device U) and becomes a waiting state waiting for P2P connection according to the NFC mode. That is, in STEP S3 shown in FIG. 6, the terminal control unit 90 becomes a state waiting for reception of a radio wave (a signal for notifying the existence of the other party transmitted by the other party) and determines whether any radio wave has been received from the multi-function device 10.

Figure 7:
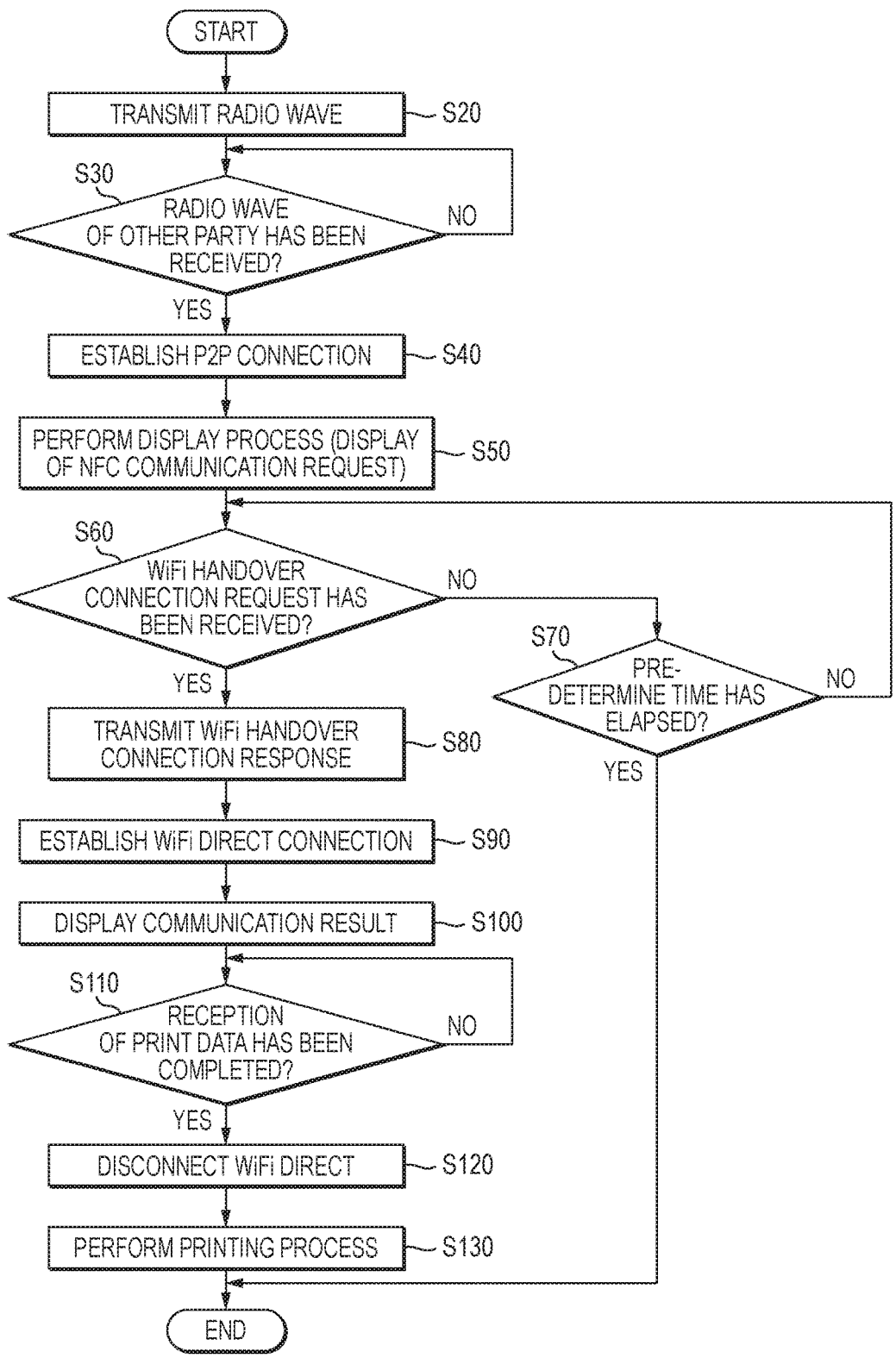
FIG. 7 is a flow chart illustrating the flow of a process which is performed on the multi-function device side in the printing process.

The control unit 80 of the multi-function device 10 is configured to perform a process shown in FIG. 7. Upon the multi-function device 10 is powered on, the control unit 80 controls the NFC module 75 of the multi-function device 10 to transmit a radio wave (a signal for notifying the other party of the existence of the multi-function device 10) and becomes a waiting state waiting for P2P connection according to the NFC mode, in STEP S20 shown in FIG. 3 or 7. Then, in STEP S30 shown in FIG. 3 or FIG. 7, the control unit 80 determines whether any radio wave (a signal for notifying the existence of the other party transmitted from the other party) has been received from the portable device U.

Figure 6:
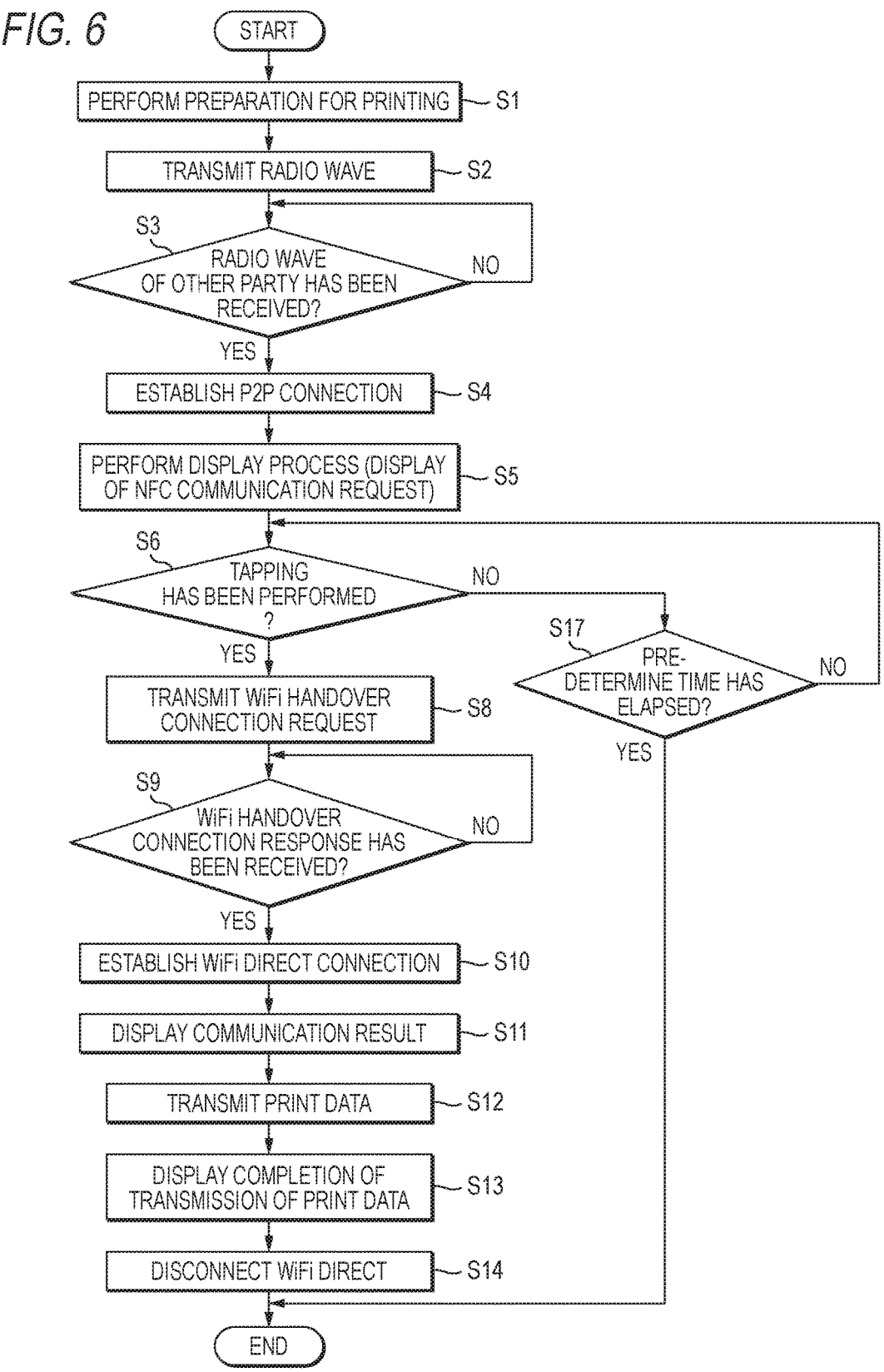
FIG. 6 is a flow chart illustrating the flow of a process which is performed on the portable device side in the printing process.

Thereafter, when the user brings the portable device U into close proximity with the multi-function device 10 such that the distance between the NFC module 110 of the portable device U and the NFC module 75 of the multi-function device 10 becomes shorter than a distance (for example, 10 cm) within which radio waves of the portable device U and the multi-function device 10 can reach the multi-function device 10 and the portable device U, respectively, the terminal control unit 90 of the portable device U performs a receiving process of receiving a radio wave from the NFC module 75 of the multi-function device 10 through the NFC module 110 ("YES" in STEP S3 shown in FIG. 3 or 6). Further, the control unit 80 of the multi-function device 10 performs a receiving process of receiving a radio wave from the NFC module 110 of the portable device U through the NFC module 75 ("YES" in STEP S30 shown in FIG. 3 or 7). As a result, the portable device U and the multi-function device 10 are physically connected through the NFC module 110 and the NFC module 75 in the P2P manner (STEP S4 shown in FIG. 3 or FIG. 6 and STEP S40 shown in FIG. 3 or FIG. 7).

Further, upon receiving the radio wave from the multi-function device 10, in STEP S5 in FIG. 3 or 6, the terminal control unit 90 of the portable device U performs a process of controlling the display operation panel 120 such that a notice for notifying the user of a P2P connection notification and a NFC communication request is displayed. As a result, for example, as shown in a screen C of FIG. 4, a message "P2P DETECTION HAS SUCCEEDED. DO YOU ALLOW WIFI DIRECT CONNECTION ACCORDING TO NFC TO BE ESTABLISHED? PLEASE TAP THE IMAGE" and the image selected as a print target are displayed on the upper side and on the lower side, respectively. On the display operation panel 120 of the portable device U, the NFC communication request, specifically, a message "DO YOU ALLOW WIFI DIRECT CONNECTION ACCORDING TO NFC TO BE ESTABLISHED? PLEASE TAP THE IMAGE" is displayed. This message is a notice for prompting the user to perform the operation for permitting the portable device U to transmit information to the multi-function device 10 when communication of information necessary to perform communication by the WiFi direct mode is performed between the portable device U and the multi-function device 10 by the NFC mode.

Then, a portion of the display operation panel 120 corresponding to the selected image (a portion surrounded by a broken line in the screen C of FIG. 4) is a designated area F designated as an operation area, and the user can tap the inside of the designated area F, thereby permitting the portable device U transmit information to the multi-function device 10 by the NFC mode.

On the other hand, upon receiving the radio wave from the portable device U, in STEP S50 shown in FIG. 3 or 7, the control unit 80 of the multi-function device 10 performs a process of controlling the display operation panel 50 of the multi-function device 10 such that a notice for notifying the user of the P2P connection notification and the NFC communication request is displayed.

Figure 5:
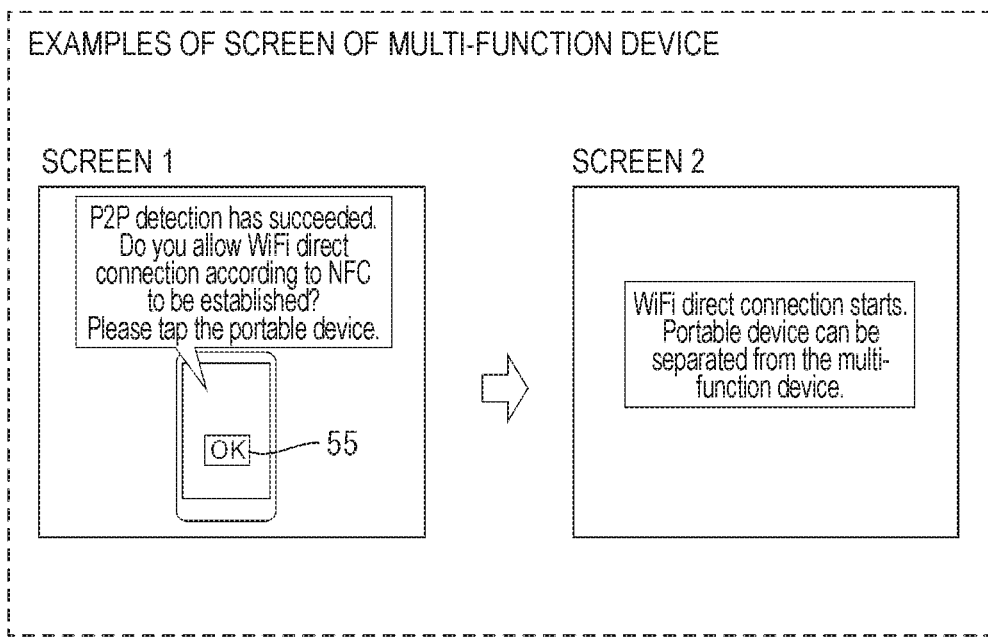
FIG. 5 is a view illustrating a screen transition of the multi-function device side.

As a result, for example, as shown in the screen 1 of FIG. 5, an image simulating the portable device U is displayed on the display operation panel 50, and a message "P2P DETECTION HAS SUCCEEDED. DO YOU ALLOW WIFI DIRECT CONNECTION ACCORDING TO NFC TO BE ESTABLISHED? PLEASE TAP THE IMAGE" and an "OK" box 55 are displayed on the upper side and on the lower side of the image simulating the portable device U, respectively. Thereafter, in STEP S60 shown in FIG. 7, the multi-function device 10 determines whether there is any WiFi handover connection request. In a case where there is no WiFi handover connection request within a predetermined time ("NO" in STEP S60 shown in FIG. 7 and "YES" in STEP S70 shown in FIG. 7), the control unit 80 finishes the process.

Display of the NFC communication request, specifically, the message "DO YOU ALLOW WIFI DIRECT CONNECTION ACCORDING TO NFC TO BE ESTABLISHED? PLEASE TAP THE IMAGE" displayed on the display operation panel 50 of the multi-function device 10 is the notice for prompting the user to perform the operation for permitting the portable device U to transmit information to the multi-function device 10 when communication of information necessary to perform communication by the WiFi direct mode (a specific wireless communication mode) is performed between the portable device U and the multi-function device 10 by the NFC mode as described above. The reason why the message for prompting the user to perform the operation is displayed on the multi-function device (10) side as described above is to support the user to perform the above-described operation while maintaining the portable device U close to the multi-function device 10.

That is, since the NFC module 110 of the portable device (U) side is provided to transmit a radio wave in a direction perpendicular to a surface where the display operation panel 120 is provided, in a case where the NFC module 75 is provided on the front wall 27 of the main case body 20 like in the multi-function device 10, in order for the multi-function device 10 and the portable device U to perform communication by the NFC mode, it is necessary to bring the portable device U into close proximity with the front wall 27 of the multi-function device 10 while keeping the portable device U upright, as shown in FIG. 1.

In this case, if the installation place of the multi-function device 10 is at a low position as seen from the user, the user needs to stoop down in order to visually recognize the screen of the portable device U, and it is often difficult for display of the portable device U to be visible to the user. Therefore, in addition to the display on the display operation panel 120 of the portable device (U) side, the notice for prompting the user to perform the operation is also displayed on the display operation panel 50 of the multi-function device 10. Accordingly, it is possible for the user to see that some operation (in the present exemplary embodiment, tapping) is necessary to enable the portable device U to transmit information to the multi-function device 10, and that a timing to perform the operation has come, from the display contents of the display operation panel 50 of the multi-function device (10) side, without trying too hard to watch the screen of the portable device U.

Further, display of the "OK" box 55 corresponds to the designated area F (the portion of a screen C of FIG. 4) displayed on the display operation panel 120 of the portable device U, and notifies the user as to which portion of the portable device (U) side needs to be tapped in order to make the operation valid. Therefore, even if the user does not try too hard to watch the screen of the portable device U, the user can see which kind of operation is necessary to enable the portable device U to transmit information to the multi-function device 10 by the NFC mode, that is, which portion of the portable device U needs to be tapped, from the display contents of the display operation panel 50 of the multi-function device (10) side.

If display for notifying the user of the position of the designated area F (display of the "OK" box 55) is not performed, the user needs to try too hard to watch the screen of the portable device U. For this reason, as a result of concentrating on watching the screen, the user may bring the portable device U away from the multi-function device 10 unconsciously. In this case, the distance between the NFC modules 75 and 110 may become larger than the communication range, and the connection according to the NFC mode is finished in the middle of communication. In view of this point, in the present invention, the user is notified of the position of the designated area F displayed on the display operation panel 120 of the portable device U by the display of the "OK" box 55. Therefore, the user does not need to try too hard to watch the screen of the portable device U, and it is possible to suppress the connection according to the NFC mode from being unintentionally interrupted.

Incidentally, by the display process of STEP S50 which is performed by the control unit 80 of the multi-function device 10, a display process of the present invention which is performed in a case where the radio wave is received in the receiving process and in which the display unit (in the present exemplary embodiment, the display operation panel 50) is controlled such that the notice (in the present exemplary embodiment, the display of the NFC communication request) for prompting the user to perform the operation for permitting the portable device to transmit information (in the present exemplary embodiment, information necessary between the portable device U and the multi-function device 10 in order to perform communication by the WiFi direct mode) to the communication apparatus (in the present exemplary embodiment, the multi-function device 10) by the near field communication mode (in the present exemplary embodiment, the NFC mode) is displayed is implemented. Further, display of the message "PLEASE TAP THE PORTABLE DEVICE" displayed on the display operation panel 50 by the display process of STEP S50 is an example of the notice for prompting the user to perform the operation on the portable device side, and display of the "OK" box 55 representing the position to be tapped is an example of the notice for prompting the user to operate the designated area of the portable device.

In STEP S6 or S17 shown in FIG. 6, the terminal control unit 90 determines whether the designated area F has been tapped within a predetermined time after the display of the screen C. Then, in a case where tapping has not been performed within the predetermined time ("NO" in STEP S6 shown in FIG. 6 and "YES" in STEP S17 shown in FIG. 6), the terminal control unit 90 finishes the process.

On the other hand, when the designated area F is tapped within the predetermined time ("YES" in STEP S6 shown in FIG. 3 or 6), the terminal control unit 90 of the portable device U having detected the tapping determines that it is possible to transmit information to the multi-function device 10 by the NFC mode, and transmits a WiFi handover connection request to the multi-function device 10 through the NFC module 110 by communication according to the NFC mode in STEP S8 shown in FIG. 3 or 6. The transmission of the WiFi handover connection request is that the terminal control unit 90 transmits information related to the portable device U and information inquiring about authentication of communication according to the WiFi direct mode through the NFC module 110 in order to perform pairing (performing mutual authentication to prevent connection with an unrelated apparatus) necessary to transition to communication in the WiFi direct mode using the wireless LAN interface 60 of the multi-function device 10 and the wireless LAN interface 100 of the portable device U.

In STEP S9 shown in FIG. 6, the portable device U determines whether there is a WiFi handover connection response from the multi-function device 10 after the transmission of the WiFi handover connection request.

The WiFi handover connection request transmitted from the portable device U is received by the NFC module 75 of the multi-function device 10 ("YES" in STEP S60 of FIG. 3 or 7). Then, when the WiFi handover connection request is received, subsequently, in STEP S80 shown in FIG. 3 or 7, the control unit 80 transmits a WiFi handover connection response to the portable device U by communication according to the NFC mode. The transmission of the WiFi handover connection response is to transmit authentication information for responding to the information inquiring about authentication of communication according to the WiFi direct mode and information related to the multi-function device 10 such as a network name to the portable device U by the NFC mode in order to authenticate transition to communication according to the WiFi direct mode and actually perform communication with the portable device U according to the WiFi direct mode.

Then, the WiFi handover connection response transmitted from the multi-function device 10 is received by the portable device U through the NFC module 110 ("YES" in STEP S9 shown in FIG. 3 or 6). When the terminal control unit 90 of the portable device U receives the WiFi handover connection response, in STEP S10 shown in FIG. 3 or 6, connection according to the WiFi direct mode is established between the portable device U and the multi-function device 10, and in STEP S11 shown in FIG. 3 or 6, the terminal control unit 90 performs a process of controlling the display operation panel 120 such that a notice for informing the user of the NFC communication result is displayed. As a result, for example, as shown in a screen D of FIG. 4, a message "WIFI DIRECT CONNECTION STARTS. PLEASE KEEP THE PORTABLE DEVICE AWAY FROM THE MULTI-FUNCTION DEVICE." is displayed on the display operation panel 120 of the portable device U. As such, by making use of the communication according to the NFC mode, the WiFi direct connection is established between the multi-function device 10 and the portable device U. Incidentally, the reason why it is possible to keep the portable device U away from the multi-function device 10 is that all communication between the portable device U and the multi-function device 10 is handed over to communication according to the WiFi direct mode after the connection according to the WiFi direct mode is established.

Further, after the control unit 80 of the multi-function device 10 transmits the WiFi handover connection response to the portable device U, connection according to the WiFi direct mode is established between the portable device U and the multi-function device 10 (in STEP S90 shown in FIG. 3 or 7), and the control unit 80 performs a process of controlling the display operation panel 50 such that a notice for informing the user of the NFC communication result is performed (in STEP S100 shown in FIG. 3 or 7). As a result, for example, as shown in the screen 2 of FIG. 5, the message "WIFI DIRECT CONNECTION STARTS. PLEASE KEEP THE PORTABLE DEVICE AWAY FROM THE MULTI-FUNCTION DEVICE." is displayed on the display operation panel 50 of the multi-function device 10.

Thereafter, in STEP S12 shown in FIG. 3 or 6, the portable device U performs a process of transmitting print data to the multi-function device 10 through the wireless LAN interfaces 60 and 100 by communication according to the WiFi direct mode.

Figure 4:
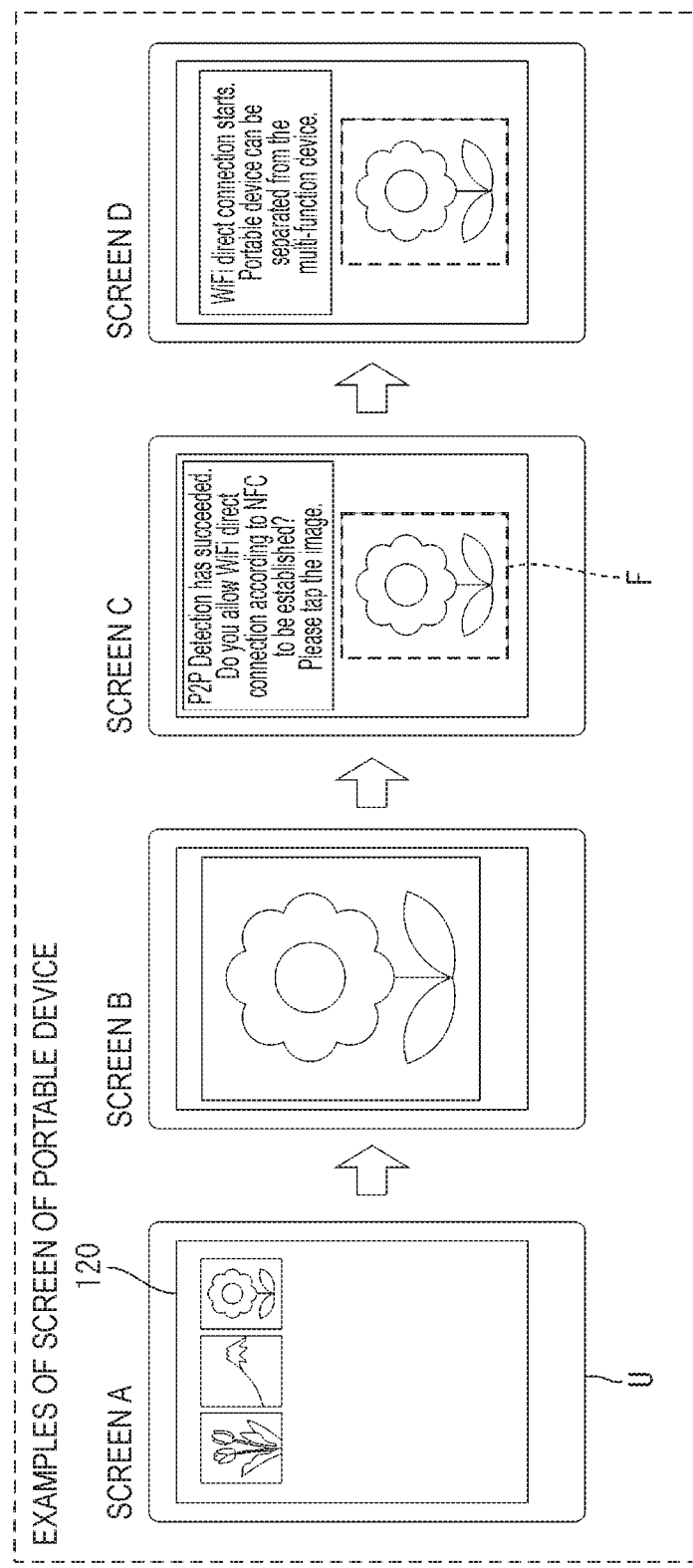
FIG. 4 is a view illustrating screen transitions of the portable device side.

In the first exemplary embodiment, print data corresponding to the image of the screen B of FIG. 4 selected by the user is transmitted from the portable device U to the multi-function device 10. Incidentally, the terminal control unit 90 performs a process of controlling the display operation panel 120 such that a notice representing that the print data is being transmitted is displayed.

Then, when the transmission of the print data finishes, in STEP S13 shown in FIG. 3 or 6, the terminal control unit 90 of the portable device U performs a process of controlling the display operation panel 120 such that a print data transmission completion notification for notifying completion of the transmission of the print data is displayed. Thereafter, the terminal control unit 90 of the portable device U performs a process of transmitting information for disconnecting communication with the multi-function device 10 according to the WiFi direct mode, to the multi-function device 10, thereby disconnecting communication according to the WiFi direct mode in STEP S14 shown in FIG. 3 or 6, and then finishes the process shown in FIG. 6.

Further, on the multi-function device (10) side, in STEP S110 shown in FIG. 3 or FIG. 7, the control unit 80 performs a receiving process of receiving the print data transmitted from the portable device U through the wireless LAN interface 60. Then, when the reception of the print data is completed ("YES" in STEP S110 shown in FIG. 7), in STEP S120 shown in FIG. 3 or 7, the control unit 80 performs a process of disconnecting communication according to the WiFi direct mode. Incidentally, determination on whether the reception of the print data has been completed may be performed by determining whether the information for disconnecting communication according to the WiFi direct mode has been received from the portable device U. Thereafter, the control unit 80 performs a printing process of printing the image based on the received print data by the printing unit 30 in STEP S130 shown in FIG. 7, and finishes the process shown in FIG. 7. In this way, it is possible to print the print data transmitted from the portable device U by the multi-function device 10.

3. Advantages

In a case of transmitting information necessary to connect communication according to the WiFi direct mode from the portable device U to the multi-function device 10 by the NFC mode, it is necessary to perform the operation for permitting transmission of the information (in the present exemplary embodiment, tapping), on the portable device (U) side. In the first exemplary embodiment, the notice for prompting the user to perform the operation (in the present exemplary embodiment, display of the NFC communication request shown in the screen 1 of FIG. 5) is displayed not only on the portable device (U) side but also on the display operation panel 50 of the multi-function device (10) side.

For this reason, since it is possible to confirm that the operation is necessary and that a timing to perform the operation has come, not only on the portable device (U) side but also on the multi-function device (10) side, it is easy for the user to recognize the necessity of the operation. That is, even if the user does not try too hard to watch the screen of the portable device (U) side, the user can see that the operation is necessary and that the timing to perform operation has come, from the display contents of the display operation panel 50 of the multi-function device (10) side.

Further, since display (the screen 1 of FIG. 1) of the NFC communication request performed on the multi-function device (10) side includes the message "PLEASE TAP THE PORTABLE DEVICE", it is possible to inform the user, who does not know that the operation on the portable device (U) side is necessary, that the operation on the portable device (U) side is necessary.

Further, the "OK" box 55 displayed in the screen 1 of FIG. 5 corresponds to the designated area F for tapping displayed on the display operation panel 120 of the portable device U (the portion of the screen C of FIG. 4 surrounded by a broken line), and notifies the user as to which portion of the portable device U needs to be tapped. Therefore, the user can perform the operation without trying too hard to watch display of the portable device (U) side, and thus operability is good.

Further, the display operation panel 50 is provided on the top wall 22 of the multi-function device 10. Since the display operation panel 50 is provided on the top wall 22 of the multi-function device 10, even if the installation place of the multi-function device 10 is at a low position as seen from the user, it is possible for the user to visibly recognize the display operation panel 50 by only lowering the user's eyes. Therefore, the display of the NFC communication request (specifically, the screen 1 shown in FIG. 5) is easily viewable.

Further, in the present exemplary embodiment, communication is handed over from the NFC mode to the WiFi direct mode. For this reason, it is possible to transmit the print data from the portable device U to the multi-function device 10 at a high communication speed by communication according to the WiFi direct mode. From the above, it is possible to reduce the time from transmission of print data to finishing printing, and thus convenience is good.

Further, in the present exemplary embodiment, in the memory 83, the display data of display images to be displayed on the display operation panel 50, specifically, the screen 1 of FIG. 5 and the image 2 of FIG. 5 are stored in advance. Therefore, when the display process of STEP S50 is performed, it is unnecessary to receive display data from the portable device U. Accordingly, as compared to a case of receiving display data from the portable device U and performing display, it is possible to quickly perform the display process of STEP S50.

Second Exemplary Embodiment

Figure 8:
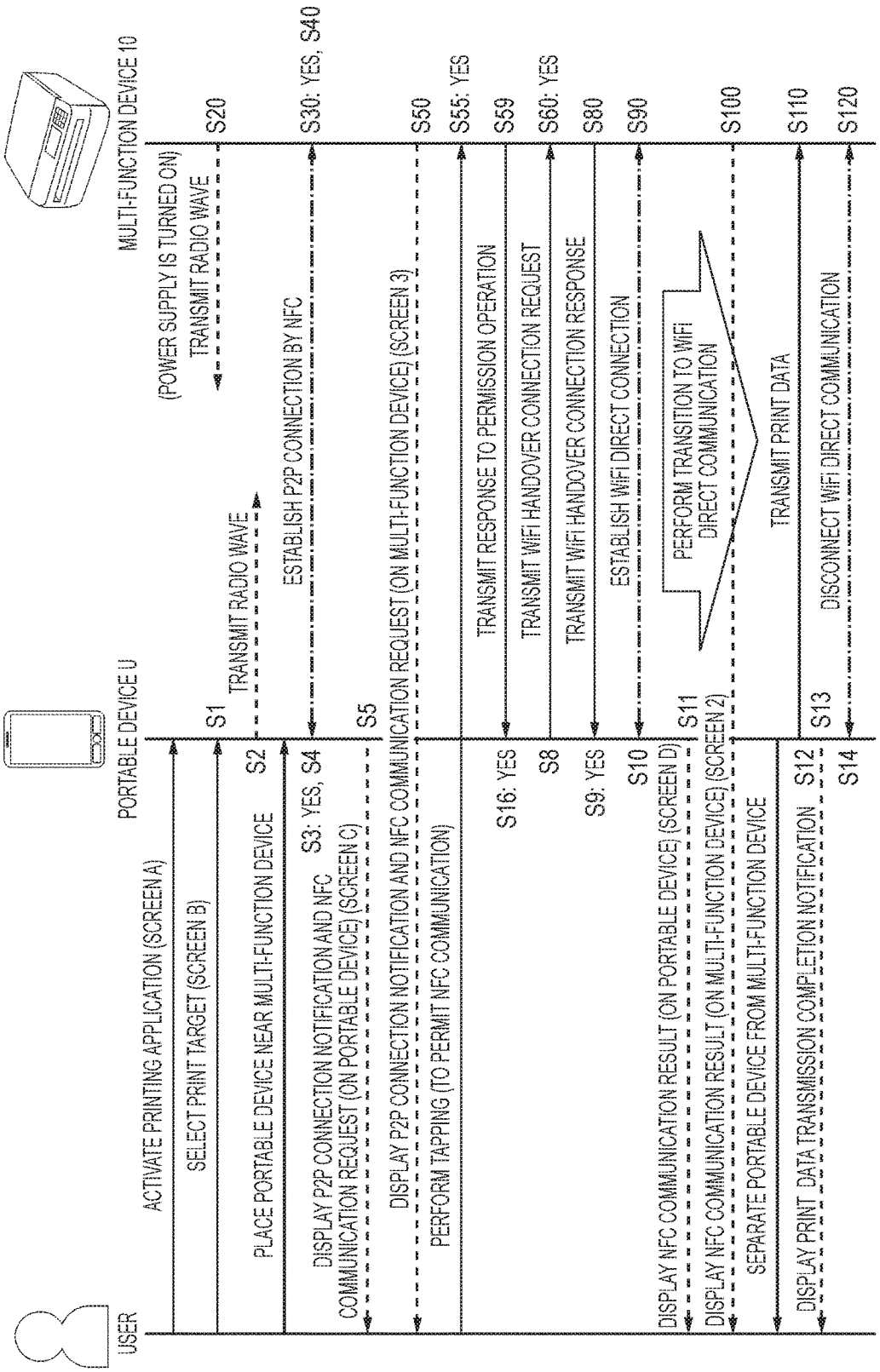
FIG. 8 is a sequence diagram illustrating the flow of a printing process according to a second exemplary embodiment.
Figure 9:
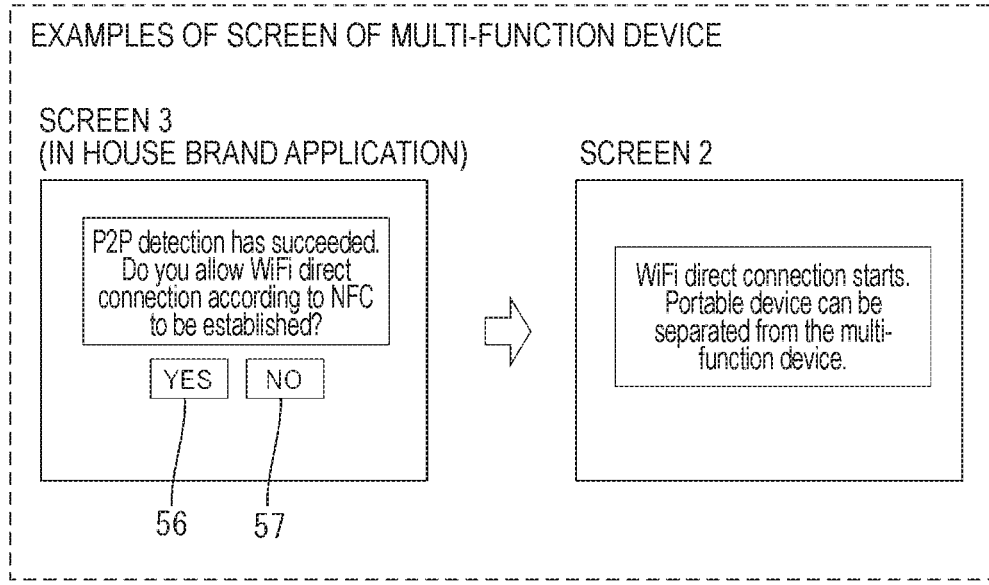
FIG. 9 is a view illustrating a screen transition of the multi-function device side.
Figure 10A:
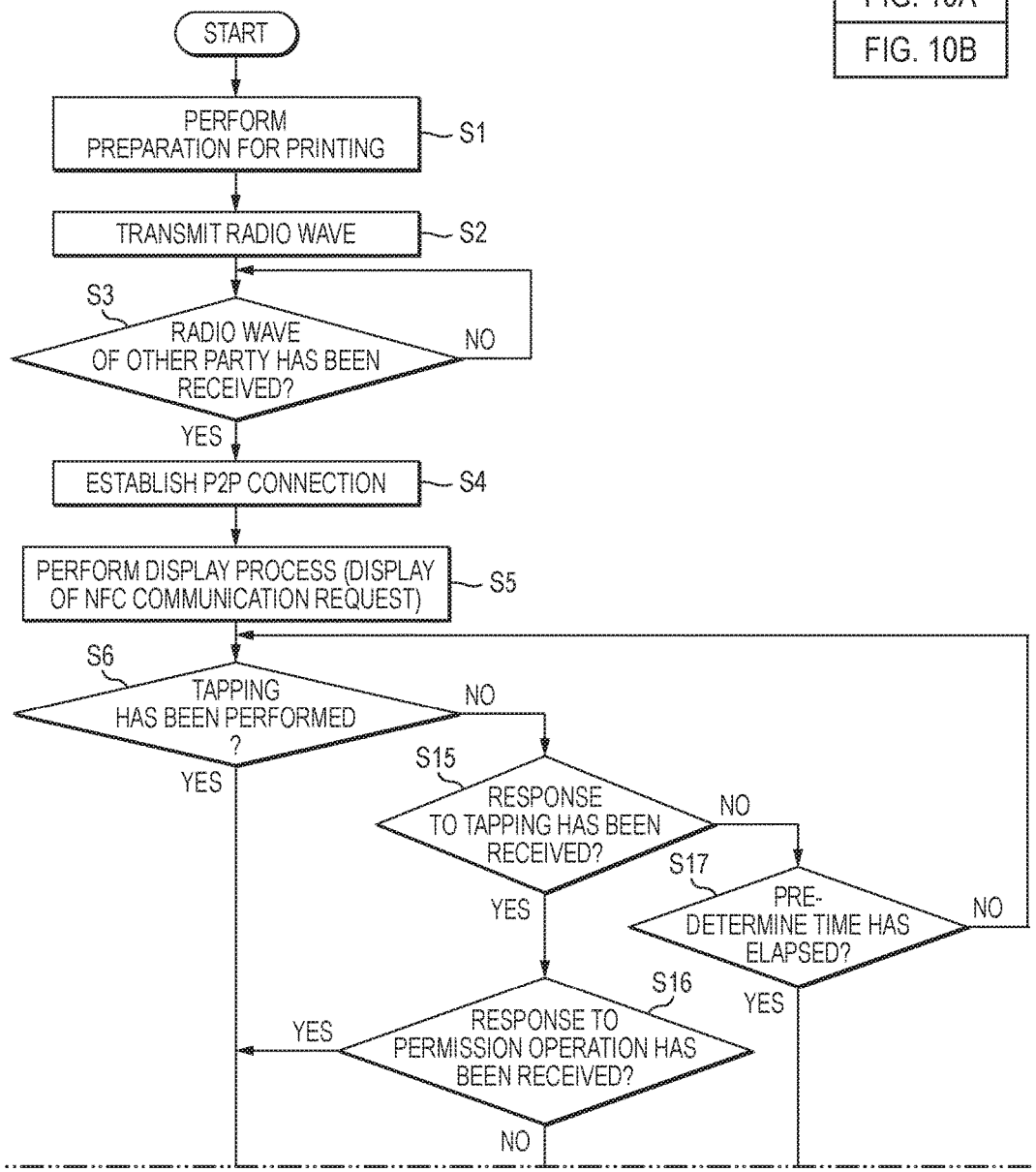
FIGS. 10A and 10B are flow charts illustrating the flow of a process which is performed on the portable device side in the printing process.
Figure 10B:
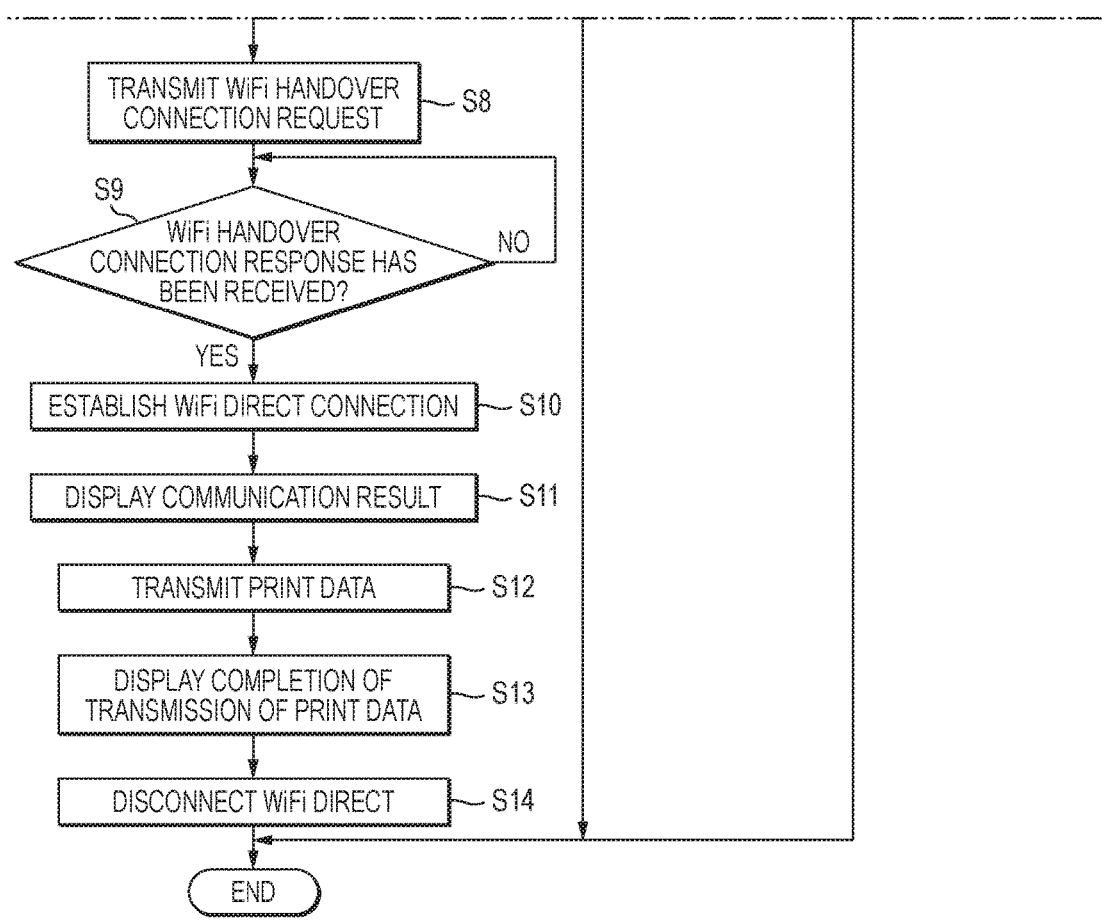
Figure 11B:
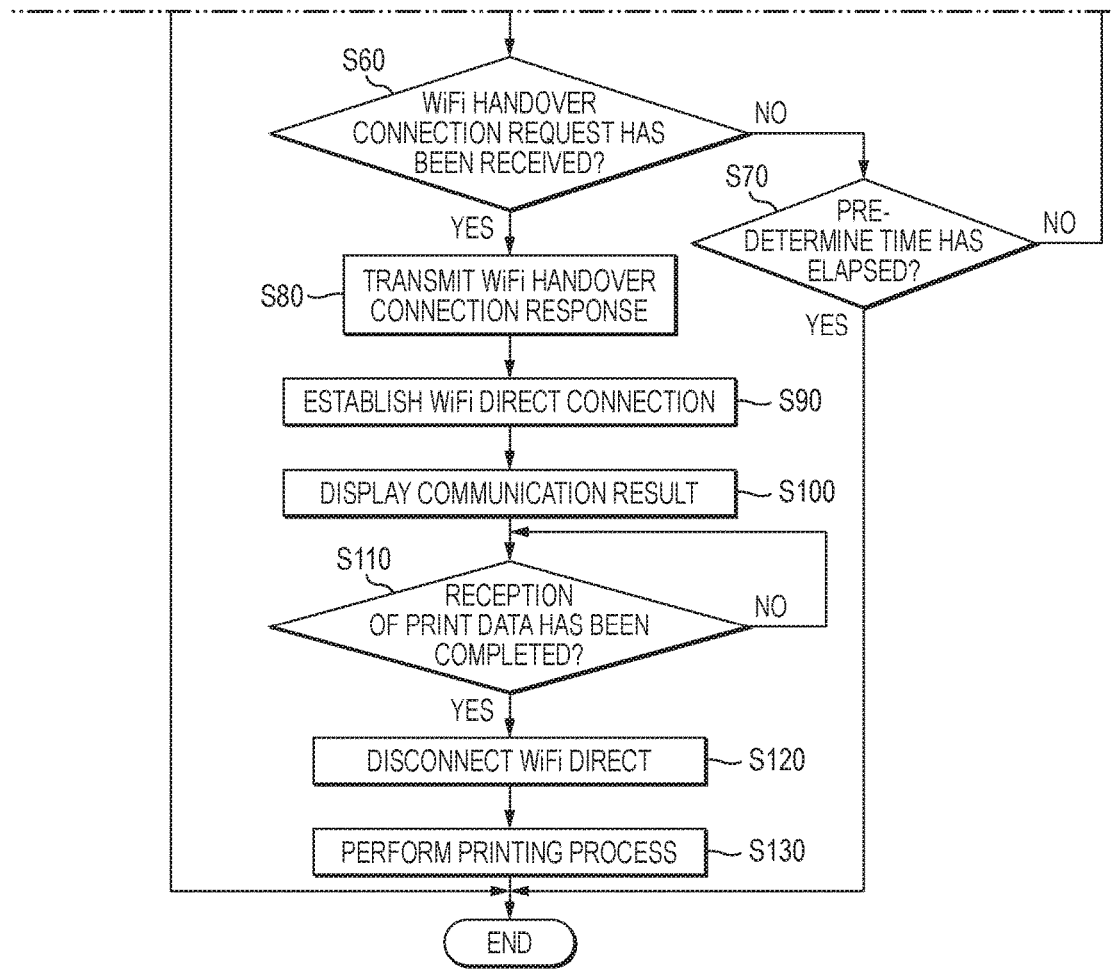

Subsequently, a second exemplary embodiment of the present invention will be described with reference to FIGS. 8 to 11. FIG. 8 is a sequence diagram illustrating the flow of a printing process which is performed between the portable device U and the multi-function device 10. FIG. 9 is a view illustrating a screen transition of the multi-function device side. FIG. 10 is a flow chart illustrating the flow of a process which is performed on the portable device side in the printing process, and FIG. 11 is a flow chart illustrating the flow of a process which is performed on the multi-function device side in the printing process. Incidentally, FIG. 10 is obtained by adding processes of STEPS S15 and S16 to FIG. 6 of the first exemplary embodiment. Further, FIG. 11 is obtained by adding processes of STEPS S51, S53, S55, S57, and S59 to FIG. 7 of the first exemplary embodiment.

In the first exemplary embodiment, whether to permit the portable device U to transmit information to the multi-function device 10 by the NFC mode is determined by tapping the designated area F of the display operation panel 120 of the portable device (U) side. That is, in a case where the user taps the designated area F, the portable device U performs a process of transmitting information to the multi-function device 10 by the NFC mode, whereas in a case where the user does not tap the designated area F, the portable device U does not perform a process of transmitting information to the multi-function device 10 by the NFC mode.

In the second exemplary embodiment, whether to permit the portable device U to transmit information to the multi-function device 10 by the NFC mode can be determined by tapping a designated area of the display operation panel 50 on the multi-function device (10) side, in addition to the portable device (U) side.

Specifically, after finishing the preparation for printing in STEP 51 shown in FIG. 8 or 10, when the user brings the portable device U into close proximity with the multi-function device 10 such that the distance between the portable device U and the multi-function device 10 becomes shorter than the distance within which radio waves of the portable device U and the multi-function device 10 can reach the multi-function device 10 and the portable device U, respectively, the NFC module 110 of the portable device U receives a radio wave from the multi-function device 10 ("YES" in STEP S3 shown in FIG. 8 or 10), and the NFC module 75 of the multi-function device 10 receives a radio wave from the portable device (U) side ("YES" in STEP S30 shown in FIG. 8 or 11). Then, in STEP S4 shown in FIG. 8 or 10 and STEP S40 shown in FIG. 8 or 12, the portable device U and the multi-function device 10 are connected in a P2P manner by the NFC mode.

Thereafter, in STEP S50 shown in FIG. 8 or 11, the control unit 80 of the multi-function device 10 performs a process of controlling the display operation panel 50 of the multi-function device 10 to display a notice for informing the user of a P2P connection notification and a NFC communication request. As a result, for example, as shown in a screen 3 of FIG. 9, a message "P2P DETECTION HAS SUCCEEDED. DO YOU ALLOW WIFI DIRECT CONNECTION ACCORDING TO NFC TO BE ESTABLISHED?" and operation boxes (in the present exemplary embodiment, a "YES" box 56 and a "NO" box 57) are displayed. The "YES" box 56 and the "NO" box 57 are designated areas for tapping, and the user can tap the inside of any one box of the "YES" box 56 and the "NO" box 57, thereby determining whether to permit the portable device U to transmit information to the multi-function device 10 by the NFC mode.

Incidentally, the term "in house brand application" described for the screen 3 of FIG. 9 means a form in which the portable device U uses a printing application (house brand application) developed by the manufacturer (so-called vendor) of the multi-function device 10. As described above, in the second exemplary embodiment, the reason why the printing application which the portable device (U) side uses is limited to the house brand application of the vendor is that whether to hand over connection to WiFi direct connection after P2P connection is established by the NFC mode can be determined not only by operating the portable device (U) side but also by operating the multi-function device (10) side.

Subsequently, in STEP S51 shown in FIG. 11, the control unit 80 of the multi-function device 10 determines whether the operation for permitting has already been completed after performance of a display process, that is, whether the "YES" box 56 displayed in the screen 3 on the display operation panel 50 has been already tapped after the performance of the display process by determining whether information representing completion of the operation for permitting has been stored in the memory 83. In a case where the information representing completion of the operation for permitting has not been stored ("NO" in STEP S51 shown in FIG. 11), in STEP S53 shown in FIG. 11, the control unit 80 determines whether a receiving process of receiving tapping has been performed. When the user performs tapping, an operation signal according to the operation (in the present exemplary embodiment, whether the "YES" box 56 has been tapped or the "NO" box 57 has been tapped) is input from the touch panel 53 of the display operation panel 50 to the control unit 80. Then, the control unit 80 of the multi-function device 10 performs a receiving process of receiving the input of the operation signal. Therefore, the control unit 80 can determine whether tapping has been received according to whether the input of the operation signal has been received.

Then, in a case of determining that tapping has been received ("YES" in STEP S53 shown in FIG. 11), in STEP S55 shown in FIG. 11, the control unit 80 determines whether tapping on the "YES" box 56 has been received or tapping on the "NO" box 57 has been received. In a case of determining that tapping on the "NO" box 57 has been received ("NO" in STEP S55 shown in FIG. 11), in STEP S57 shown in FIG. 11, the control unit 80 of the multi-function device 10 transmits a prohibition operation response, which is information representing that operation for prohibiting the portable device U from transmitting information to the multi-function device 10 has been received by the multi-function device 10, to the portable device U. Then, the control unit 80 determines that it has become unnecessary to perform communication between the portable device U and the multi-function device 10 by the NFC mode, and finishes the process shown in FIG. 11.

On the other hand, in a case of determining that tapping on the "YES" box 56 has been received ("YES" in STEP S55 shown in FIG. 8 or 11), in STEP S59 shown in FIG. 8 or 11, the control unit 80 of the multi-function device 10 stores information representing completion of the operation for permitting in the memory 83, and transmits a permission operation response, which is information representing that the operation for permitting the portable device U to transmit information to the multi-function device 10 has been received by the multi-function device 10, to the portable device U. In a case where tapping on the "NO" box 57 is not received ("YES" in STEP S51, "NO" in STEP S53, or "YES" in STEP S55 shown in FIG. 11), in STEP S60 shown in FIG. 11, the control unit 80 determines whether there is a WiFi handover connection request.

Incidentally, by the process of STEP S57 (the process of transmitting the prohibition operation response to the portable device U) and the process of STEP S59 (the process of transmitting the permission operation response to the portable device U) which are performed by the control unit 80, a "responding process of transmitting information to the portable device in response to the received operation (in the present invention, the prohibition operation response or the permission operation response)" according to the present invention is implemented.

After the notice for informing the user of the "P2P connection notification" and the "NFC communication request" like the screen C shown in FIG. 4 is displayed on the display operation panel 120 in STEP S5 shown in FIG. 8 or 10, in STEP S6 shown in FIG. 10, the terminal control unit 90 of the portable device U determines whether the designated area F of the inside of the screen C has been tapped. In a case where the designated area F has not been tapped ("NO" in STEP S6 shown in FIG. 10), in STEP S15 shown in FIG. 10, the terminal control unit 90 determines whether information representing that operation for permitting or prohibiting information transmission of the portable device U to the multi-function device 10 had been received by the multi-function device 10 and transmitted by the multi-function device 10 has been received through the NFC module 110 by the P2P connection. That is, the terminal control unit 90 determines whether the permission operation response or the prohibition operation response transmitted from the multi-function device 10 has been received. Then, in a case where the designated area F is not tapped and not only the permission operation response but also the prohibition operation response is not received within a predetermined time ("NO" in STEP S6, "NO" in STEP S15, and "YES" in STEP S17 shown in FIG. 10), the terminal control unit 90 finishes the process.

On the other hand, when the designated area F is tapped ("YES" in STEP S6 shown in FIG. 10), or the permission operation response is received through the NFC module 110 ("YES" in STEP S16 shown in FIG. 8 or 11) within the predetermined time, the terminal control unit 90 of the portable device U determines that it has become possible to transmit information to the multi-function device 10 by the NFC mode, and transmits a WiFi handover connection request to the multi-function device 10 through the NFC module 110 by communication according to the NFC mode in STEP S8 shown in FIG. 8 or FIG. 10. Upon receiving the prohibition operation response through the NFC module 110 ("NO" in STEP S16 shown in FIG. 10), the terminal control unit 90 determines that it has become unnecessary to perform communication between the portable device U and the multi-function device 10 by the NFC mode, and finishes the process shown in FIG. 10.

The subsequent processes are the same as those of the first exemplary embodiment, and the portable device U and the multi-function device 10 display the message "WIFI DIRECT CONNECTION STARTS. PLEASE KEEP THE PORTABLE DEVICE AWAY FROM THE MULTI-FUNCTION DEVICE." on the display operation panels 120 and 50, respectively, as shown in the screen D of FIG. 4 and the screen 2 of FIG. 9, and a process of establishing wireless communication according to the WiFi direct mode (connection) between the portable device U and the multi-function device 10 is performed. Then, the wireless communication according to the WiFi direct mode between the portable device U and the multi-function device 10 is established. Thereafter, a process of transmitting print data from the portable device U to the multi-function device 10 through the wireless LAN interfaces 60 and 100 by communication according to the WiFi direct mode is performed.

Third Exemplary Embodiment

Figure 12:
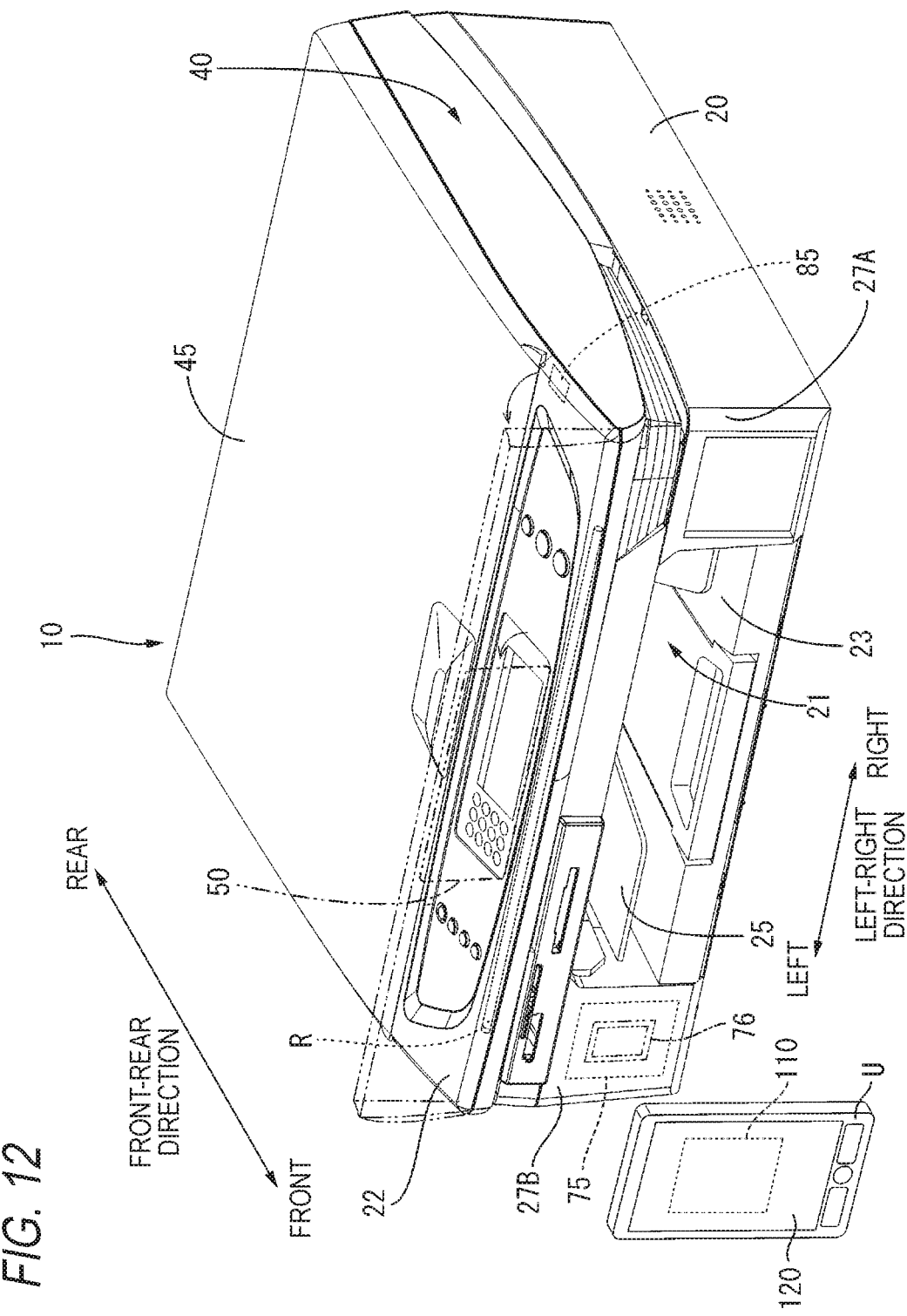
FIG. 12 is a perspective view illustrating a multi-function device according to a third exemplary embodiment.
Figure 13:
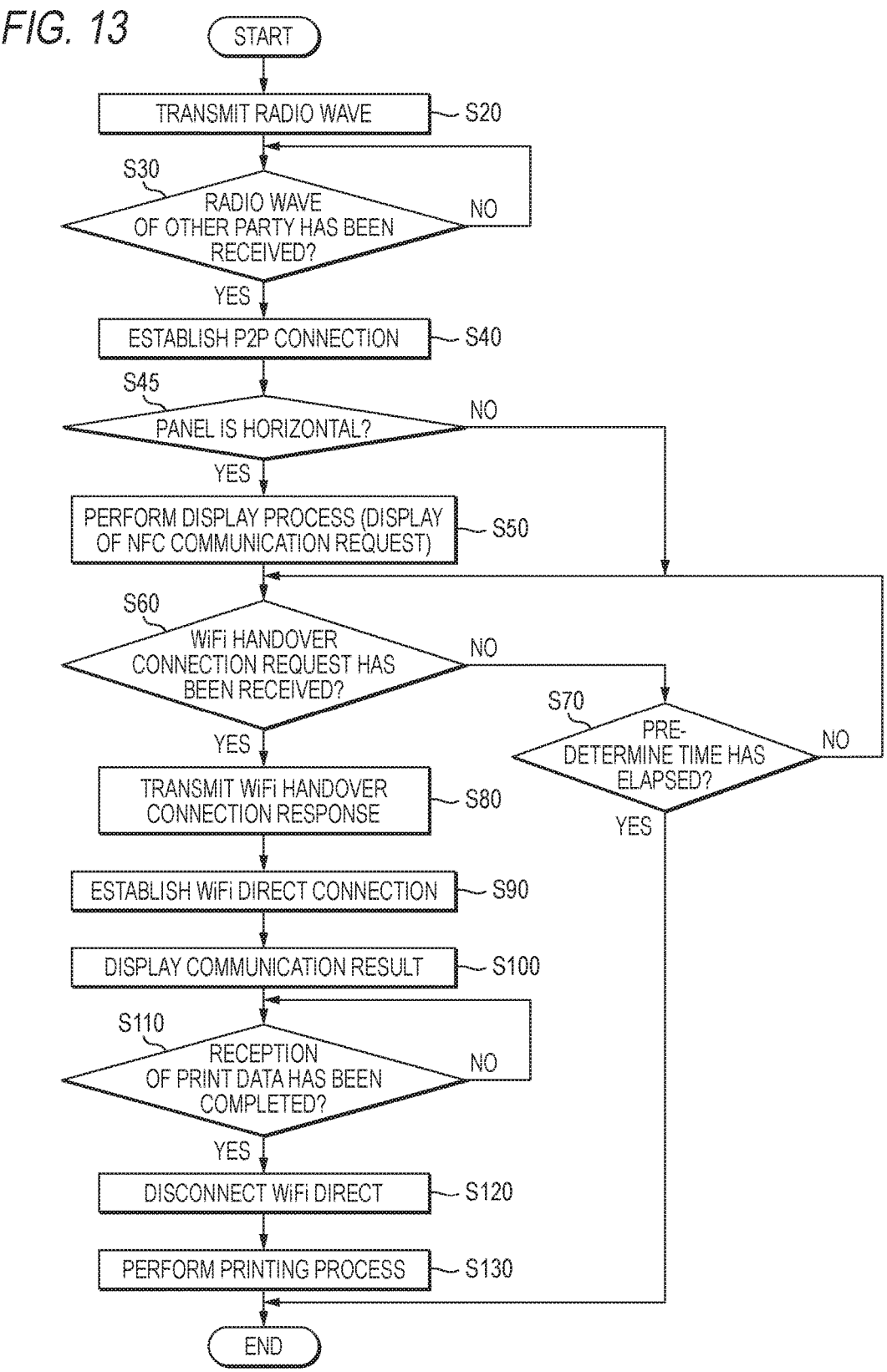
FIG. 13 is a flow chart illustrating the flow of a process which is performed on the multi-function device side in a printing process.

Subsequently, a third exemplary embodiment of the present invention will be described with reference to FIGS. 12 and 13. FIG. 12 is a perspective view illustrating a multi-function device according to the third exemplary embodiment, and FIG. 13 is a flow chart illustrating the flow of a process which is performed on the multi-function device in a printing process. Incidentally, the flow of a process which is performed on the portable device side in the printing process is the same as FIG. 6 of the first exemplary embodiment, and thus is not shown.

In a multi-function device 10 of the third exemplary embodiment, a rotating shaft R is provided at the upper front portion of the main case body 20. The rotating shaft R extends in a horizontal direction and is configured to rotatably support the front end portion of the top wall 22. Since the display operation panel 50 is provided on the top wall 22, it is possible to change the mounting angle of the display operation panel 50 relative to the main case body 20 by rotating the top wall 22 on the rotating shaft R. That is, it is possible to change the mounting angle from about 0° as shown by a solid line in FIG. 12 to about 90° as shown by an alternate long and two short dashes line in FIG. 12. The reason why the angle of the display operation panel 50 is made changeable as described above is that visibility of contents displayed on the display operation panel 50 depends on the height of the eyes of the user and the installation height of the multi-function device 10. For example, in a case of seeing the display contents from a distance, it may be easier for the user to see displayed contents as the angle of the display operation panel 50 is set closer to 90°.

However, in a case of bringing the portable device U into close proximity with the top wall 22 for P2P connection, since the user is comparatively close to the multi-function device 10 and is likely to look down on the multi-function device 10, if the angle of the display operation panel 50 is 90°, it may be difficult for the user to see the display of the display operation panel 50. For this reason, in the third exemplary embodiment, the mounting angle of the display operation panel 50 is detected, and the control unit 80 selects whether to perform display of the screen 1 shown in FIG. 5.

Specifically, in the third exemplary embodiment, a process of STEP S45 shown in FIG. 13 is included in the process of the multi-function device side according to the printing process described in the first exemplary embodiment (the flow chart shown in FIG. 7). The process of STEP S45 is performed after the user brings the portable device U into close proximity with the multi-function device 10 and the portable device U and the multi-function device 10 are connected in a P2P manner by NFC. In STEP S45, the control unit 80 of the multi-function device 10 detects whether the mounting angle of the display operation panel 50 is 0° or not.

In the present exemplary embodiment, a sensor 85 for detecting the display operation panel 50 is mounted on a portion of the main body casing 2 facing the top wall 22. The sensor 85 is, for example, a contact type switch. In a case where the display operation panel 50 is substantially horizontal (a case of a state shown by the solid line in FIG. 12), the sensor 85 comes contact with the rear surface of the top wall 22 and becomes an ON state. On the other hand, in a case where the display operation panel 50 is not substantially horizontal, such as a case where the display operation panel 50 is vertical (a case of a state shown by the alternate long and two short dashes line in FIG. 12), the sensor 85 is separated from the rear surface of the top wall 22 and becomes an OFF state. Therefore, the control unit 80 of the multi-function device 10 is able to determine whether the display operation panel 50 is substantially horizontal by detecting the output of the sensor 85 is the ON state or the OFF state.

Then, in a case where the display operation panel 50 is substantially horizontal, "YES" is determined in STEP S45, and the process proceeds to STEP S50.

In STEP S50, like in the first exemplary embodiment, the screen 1 shown in FIG. 5 is displayed. That is, the message "P2P DETECTION HAS SUCCEEDED. DO YOU ALLOW WIFI DIRECT CONNECTION ACCORDING TO NFC TO BE ESTABLISHED? PLEASE TAP THE PORTABLE DEVICE" and the "OK" box 55 representing the designated area for tapping are displayed on the upper side and on the lower side of the image simulating the portable device U, respectively. Thereafter, the multi-function device 10 becomes a state waiting for the WiFi handover connection request to be transmitted from the portable device U.

On the other hand, in a case where the display operation panel 50 is not substantially horizontal, "NO" is determined in STEP S45. In this case, the process does not proceed to STEP S50 but proceeds to STEP S60. That is, the screen 1 shown in FIG. 5 is not displayed on the display operation panel 50, and the multi-function device 10 becomes a state waiting for the WiFi handover connection request to be transmitted from the portable device U ("NO" in STEP S60). As described above, in the third exemplary embodiment, in a case where the display operation panel 50 is easily viewable to the user, since the screen 1 of FIG. 5 is displayed, the process is efficient, and convenience is good. Incidentally, a "determining process" of the present invention is implemented by the process of STEP S45 which is performed by the control unit 80 of the multi-function device 10. Further, in the third exemplary embodiment, whether to perform the display process is determined on the basis of the mounting angle of the display operation panel 50. However, whether to perform the display process may be determined, for example, on the basis of the installation height of the multi-function device 10. For example, in a case where the installation height of the multi-function device 10 is low and thus it is difficult to see the screen of the display operation panel 120 of the portable device U when the portable device U is in close proximity with the multi-function device 10, the display process of STEP S50 may be performed, whereas in a case where the installation height of the multi-function device 10 is high and thus it is comparatively easy to see the screen of the display operation panel 120 of the portable device U when the portable device U is in close proximity with the multi-function device 10, the display process of STEP S50 may not be performed.

Other Exemplary Embodiments

The present invention is not limited to the exemplary embodiments described with reference to the drawings, and, for example, the following exemplary embodiments are also included in the technical range of the present invention.

(1) In the above-described first to third exemplary embodiments, as the portable device U, a mobile phone (for example, a smart phone) has been exemplified. However, the portable device U needs only to be capable of being held over the NFC interface of the communication apparatus, and may be any other apparatuses such as a PDA, a notebook PC, a tablet PC and a portable media player such as a portable music player and a portable video player. Further, in the first to third exemplary embodiments, as the printing unit, an inkjet type printing unit has been exemplified. However, an electrophotographic type printing unit may be used.

(2) In the first exemplary embodiment, whether to permit the portable device U to transmit information to the multi-function device 10 by the NFC mode is determined according to whether to tap the designated area F of the display operation panel 120 of the portable device (U) side. However, whether to permit the portable device U to transmit information to the multi-function device 10 by the NFC mode may be determined according to the number of times of tapping the designated area F. For example, in a case where the number of times of tapping is one, the portable device U is permitted to transmit information to the multi-function device 10 by the NFC mode, and issues the WiFi handover connection request, whereas in a case where the number of times of tapping is two, the portable device U is prohibited from transmitting information to the multi-function device 10 by the NFC mode, such that the WiFi handover connection request is not issued.

Figure 14:
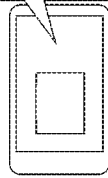
FIG. 14 is a view illustrating a screen transition of the multi-function device side according to a modified exemplary embodiment.

Further, in the case where whether to permit the portable device U to transmit information to the multi-function device 10 by the NFC mode may be determined according to the number of times of tapping the designated area F as described above, in the display process of STEP S50, together with the message "P2P DETECTION HAS SUCCEEDED. DO YOU ALLOW WIFI DIRECT CONNECTION ACCORDING TO NFC TO BE ESTABLISHED?", the number of times of tapping necessary to permit transmission of information (in this example, one), and the number of times of tapping necessary to prohibit transmission of information (in this example, two) may be displayed (for example, a screen 4 of FIG. 14).

(3) In the first to third exemplary embodiments, an example in which the portable device U is used to access the multi-function device 10 and perform a printing process has been described. However, the portable device U may be used to access the multi-function device 10 and perform a scanner process of reading an image. For example, after an image of a document sheet is read by the scanning unit 40, the read data may be transmitted from the multi-function device (10) side to the portable device (U) side by the communication according to the WiFi direct mode.

(4) In the first exemplary embodiment, an example in which when communication of information necessary between the portable device U and the multi-function device 10 to perform communication according to the WiFi direct mode (the specific wireless communication mode) is performed by the NFC mode, as the notice for prompting the user to perform the operation for permitting the portable device U to transmit information to the multi-function device 10 (the notice for prompting the user to perform the operation on the portable device (U) side), the message "DO YOU ALLOW WIFI DIRECT CONNECTION ACCORDING TO NFC TO BE ESTABLISHED? PLEASE TAP THE PORTABLE DEVICE." is displayed has been described. However, this is an example of the notice for prompting, and a message or display for informing an intention to prompt the operation may be used. For example, a message "TRANSMISSION OF INFORMATION IS NECESSARY FOR HIGH-SECURITY COMMUNICATION CONNECTION. PLEASE PERFORM DETERMINATION OPERATION." may be used.

(5) Further, in the first to third exemplary embodiments, in a case where transmission of information is permitted by tapping, information for performing a connection handover handing over the communication mode to wireless communication according to the WiFi direct mode, that is, information related to the multi-function device 10 such as authentication information and a network name is transmitted from the multi-function device 10 to the portable device U by communication according to the NFC mode. Information which is transmitted between the portable device U and the multi-function device 10 is not limited to the information for handing over the communication mode to high-speed wireless communication as described above, but may be any other information such as print data. That is, in a case where transmission of information is permitted, print data may be transmitted from the portable device U to the multi-function device 10 by communication according to the NFC mode, without handing over the communication mode.

(6) In the first to third exemplary embodiments, the NFC mode has been described as an example of the near field communication mode, and the WiFi direct mode has been described as an example of the specific wireless communication mode. The near field communication mode may be any modes such as communication modes based on ISO/IEC 14443 and ISO/IEC 15693, other than the NFC. Further, the specific wireless communication mode may be any modes such as a Bluetooth (registered trademark) communication mode and an infrared communication mode, other than the WiFi direct mode.

(7) In the first to third exemplary embodiments, the multi-function device has been described as an example of the communication apparatus. However, the communication apparatus may be any other apparatus such as a printer or a scanner.

(8) In the first to third exemplary embodiments, as an example of a communication process when the portable device U and the multi-function device 10 are connected in the P2P manner, an example in which both of the portable device U and the multi-function device 10 transmit radio waves and receive the radio waves transmitted from the other party has been described. However, a radio wave for detection may be transmitted from the multi-function device 10, and the portable device U may receive the radio wave for detection and returns a radio wave for informing that the radio wave of detection has been received as a response to the multi-function device 10. Alternatively, the portable device (U) side may transmit a radio wave for detection, and the multi-function device side may receive the radio wave for detection and returns a radio wave as a response to the portable device (U) side.

(9) In the first exemplary embodiment, in the display process of STEP S50, the NFC communication request is displayed on the display operation panel of the multi-function device 10. It is preferable to synchronize the timing for the control unit 80 to perform the display process of STEP S50, that is, the timing for the multi-function device (10) side to display the NFC communication request with the timing for the portable device (U) side to display the NFC communication request. If the display of the portable device (U) side is not in sync with display of the multi-function device (10) side and thus display of the NFC communication request is performed on the multi-function device (10) side before the portable device (U) side performs display of the NFC communication request, troubles such as a trouble in which the corresponding screen C is not displayed and thus tapping is impossible even if the user having seen the screen 1 of the multi-function device 10 tries to perform tapping on the portable device (U) side are caused. However, in the case where the display timing of the portable device (U) side is synchronized with the display timing of the multi-function device (10) side, those troubles are not caused and operability is good.

Incidentally, in order to synchronize the timing for the multi-function device 10 to display the NFC communication request with the timing for the portable device (U) side to display the NFC communication request, a synchronization signal for informing the performance timing of display of the NFC communication request may be transmitted from the portable device (U) side to the multi-function device 10, and the multi-function device 10 may perform display of the NFC communication request in response to reception of the synchronization signal. From the above, the control unit of the present invention is implemented to perform the display process on the basis of a synchronization signal transmitted from the portable device, thereby performing the display process at a timing which is in sync with the timing for the portable device side to display the screen for prompting the user to perform the operation.

Further, in a case where the multi-function device 10 transmits a radio wave for detection and the portable device (U) side receives the radio wave and returns a radio wave as a response, the communication process when P2P connection is performed can use the radio wave which is the response, as the synchronization signal. That is, when the radio wave for detection is received from the multi-function device 10, the portable device (U) side displays the NFC communication request and transmits a radio wave as a response to the multi-function device 10 (in this case, the portable device side returns the radio wave as a response to the multi-function device 10 almost at the same time with the performance timing of STEP S5 shown in FIG. 3).

Then, the multi-function device 10 performs the display process of STEP S50 in response to reception of the radio wave as a response from the portable device U. Therefore, the multi-function device 10 can display the NFC communication request (the screen 1 of FIG. 5) at a timing synchronized with the timing for the portable device (U) side to display the NFC communication request (the screen C of FIG. 4).

(10) In the second exemplary embodiment, after the portable device U and the multi-function device 10 are connected in the P2P manner, the screen 3 of FIG. 9, that is, a message "P2P DETECTION HAS SUCCEEDED. DO YOU ALLOW WIFI DIRECT CONNECTION ACCORDING TO NFC TO BE ESTABLISHED?" and the operation boxes (in the second exemplary embodiment, the "YES" box 56 and the "NO" box 57) are displayed. Then, the user determines whether to permit the portable device U to transmit information to the multi-function device 10 by the NFC mode, by tapping the inside of any one box of the "YES" box 56 and the "NO" box 57 (hereinafter, referred to as determination operation). The determination operation which is performed on the multi-function device (10) side is not limited to tapping the display operation panel 50 like in the second exemplary embodiment, but may be key operation on press keys of "YES" and "NO".

(11) In the third exemplary embodiment, in STEP S45, whether to display the NFC communication request on the display operation panel 50 of the multi-function device 10 is determined according to the mounting angle of the display operation panel 50. In the third exemplary embodiment, a configuration obtained by adding the process of STEP S45 to the first exemplary embodiment has been described. However, the process (STEP S45) of determining whether to display the NFC communication request on the display operation panel 50 according to the mounting angle of the display operation panel 50 may also be applied to the second exemplary embodiment.

(12) Further, in the third exemplary embodiment, as a sensor for detecting the mounting angle of the display operation panel 50, the contact type switch 85 has been exemplified. In a case where the switch 85 is in the ON state (a case where the display operation panel 50 is horizontal), the NFC communication request is displayed, whereas in a case where the switch is in the OFF state (a case where the display operation panel 50 is vertical), the NFC communication request is not displayed. As the sensor for detecting the mounting angle of the display operation panel 50, besides the contact type switch 85, an angle sensor can be used. Since an angle sensor can arbitrarily detect not only specific angles such as 0° or 90° but also the mounting angle of the display operation panel 50 (the angle sensor can detect all angles), it is possible to arbitrarily determine a threshold value for determining whether to display the NFC communication request. For example, if the threshold value is set to 45°, and the mounting angle of the display operation panel 50 is equal to or larger than 45° which is the threshold value, the NFC communication request may be displayed, whereas in a case where the mounting angle of the display operation panel 50 is less than 45° which is the threshold value, the NFC communication request may not be displayed.

As exemplary embodiments of the above-described communication apparatus, the following configurations are preferable.

The first type communication unit may be provided on a front face of the communication apparatus.

In a case where the first type communication unit is provided on the front face (e.g., front wall) of the communication apparatus, in order for communication with the first type communication unit, it is necessary to bring the portable device into close proximity with the front wall. In a state where the portable device is in close proximity with the front wall, it is often difficult for display of the portable device to be visible to the user. The reason is that if the installation place of the communication apparatus is at a low position as seen from the user, the user needs to stoop down in order to visually recognize the screen of the portable device. Thus, when the present invention is applied to that case, it is possible to prompt the user to perform operation by the display unit of the communication apparatus side, instead of the portable device. Therefore, it is easy for the user to recognize that the operation for permitting transmitting information is necessary.

The display unit may be provided on a top face of the communication apparatus.

In this case, even if the installation place of the communication apparatus is at a low position as seen from the user, if the user lowers the eyes, it is possible to visually recognize the display unit. For this reason, when the display unit is provided on the top face (e.g., top wall) of the communication apparatus, display of the display unit is easily viewable, and it is easy for the user to recognize that the operation for permitting transmitting information is necessary.

The communication apparatus may further comprise an operation unit. The control device may be configured to, after performing the display process, perform a receiving process of receiving the operation through the operation unit. Upon the operation is received in the receiving process, the control device may be configured to perform a responding process of transmitting information according to the received operation as a response to the portable device.

In this configuration, since it is possible to perform the operation for permitting transmitting information on the communication apparatus side, operability is good.

The display unit may include the operation unit.

In this case, display is easily viewable, and it is possible to perform operation while watching display. Therefore, it is easy to perform the operation.

The control device may be configured to control the display unit to display the notice for prompting the user to perform the operation on the portable device side.

In this configuration, it is possible to make the user recognize that an operation target is the portable device side.

In the display process, the control device may be configured to control the display unit to display a notice for prompting the user to operate a designated area of the portable device.

Since the notice for prompting the user to operate the designated area of the portable device is displayed, when the user operates the designated area of the portable device according to that display, the portable device is permitted to transmit information to the communication apparatus in a near field communication mode. Therefore, in a case where display of the portable device is difficult to be seen, for example, in a case where it is necessary for the user to stoop down for watch display, it is possible for the user to perform the operation according to that display without trying too hard to watch display of the portable device. Therefore, operability is good.

In the display process, the control device may be configured to control the display unit to display a number of times of tapping the designated area for permitting the portable device to transmit information to the communication apparatus in the near field communication mode.

According to this configuration, it is possible to confirm the necessary number of times of tapping even on the communication apparatus side.

The control device may be configured to perform the display process on the basis of a synchronization signal transmitted from the portable device, thereby performing the display process at a timing synchronized with a timing for the portable device side to display the notice for prompting the user to perform the operation.

If display of the portable device side is not in sync with display of the communication apparatus side, even if the user having seen display of the communication apparatus side performs operation on the portable device side, display of the portable device side may not correspond to the display of the communication apparatus side, resulting in troubles such as a trouble in which operation is impossible. However, when the display timing of the portable device side is in sync with the display timing of the communication apparatus side, there is no fear for those troubles to be caused, and operability is good.

The communication apparatus may further comprise a memory for storing display data for displaying the notice for prompting the user to perform the operation, in advance.

According to this configuration, it is unnecessary to receive display data from the portable device.

The control device may be configured to perform a determining process of determining whether to perform the display process.

The communication apparatus may further comprise: a horizontal rotating shaft configured to rotatably support the display unit with respect to the communication apparatus; and a sensor configured to detect a mounting angle of the display unit relative to the communication apparatus. In the determining process, the control device may be configured to determine whether to perform the display process on the basis of the mounting angle of the display unit.

Since the display unit performs the display process in a case where it is easy for the display unit to be easily viewable to the user, the process is efficient, and convenience is good.

The communication apparatus may further comprise: a second type communication unit configured to perform communication with a portable device in a specific wireless communication mode whose communication speed is higher than that of the near field communication mode; and a printing unit. In the display process, the control device may be configured to control the display unit to display a notice for prompting the user to perform the operation for permitting the portable device to transmit information, which is necessary to perform communication with the portable device in the specific wireless communication mode, to the communication apparatus in the near field communication mode. The control device may be configured to communicate the information with the portable device through the first type communication unit in the near field communication mode so as to establish a connection with the portable device in the specific wireless communication mode. After establishing the connection with the portable device in the specific wireless communication mode, the control device may be configured to perform a receiving process of receiving print data from the portable device through the second type communication unit. The control device may be configured to control the printing unit to perform a printing process of performing printing on the basis of the print data received in the receiving process.

Since it is possible to use the portable device to access the communication apparatus and print the print data at a high communication speed, convenience is good.

What is claimed is:

1. A communication system comprising:
    a first apparatus, comprising:
        a first communication interface configured to communicate when the first apparatus is in a first wireless communication mode;
        a first display;
        a first user interface; and
        a first controller configured to:
            establish a first wireless communication connection in response to receipt of a first radio wave by the first communication interface;
            after establishing the first wireless communication connection, control the first display of the first apparatus to display a first notice prompting a user to input a specific operation on the first apparatus for permitting the first apparatus to transmit information via the first wireless communication connection, wherein the information is used for switching to a second wireless communication connection from the first wireless communication connection;
            receive the specific operation input by the user through the first user interface; and in response to receipt, when the first notice prompting the user to input the specific operation is displayed, of the specific operation on the first apparatus for permitting the first apparatus to transmit the information to be used for switching to the second wireless communication connection from the first wireless communication connection, transmit the information via the first wireless communication connection; and a second apparatus, comprising:
a second communication interface configured to communicate with the first apparatus when the second apparatus is in the first wireless communication mode;
a second display; and
a second controller configured to:
establish the first wireless communication connection in response to receipt of a second radio wave from the first apparatus by the second communication interface;
after establishing the first wireless communication connection and while the first controller of the first apparatus is controlling the first display of the first apparatus to display the first notice prompting the user to input the specific operation on the first apparatus for permitting the first apparatus to transmit the information, to be used for switching to the second wireless communication connection from the first wireless communication connection, via the first wireless communication connection, control the second display of the second apparatus to display a second notice prompting the user to perform the specific operation on the first apparatus for permitting the first apparatus to transmit the information to the second apparatus via the first wireless communication connection;
receive the information transmitted from the first apparatus via the first wireless communication connection; and
in response to receipt of the information:
control the second display to stop displaying the second notice; and
switch the second apparatus from the first wireless communication mode to a second wireless communication mode in which the second apparatus communicates with the first apparatus based on the information via the second wireless communication connection whose communication speed is higher than that of the first wireless communication connection.

2. The communication system according to claim 1, wherein the second communication interface is provided on a front face of the second apparatus.

3. The communication system according to claim 1, wherein the second display is provided on a top face of the second apparatus.

4. The communication system according to claim 1, further comprising:
a second user interface,
wherein the second controller is further configured to control the second display to display a third notice prompting the user to perform a second operation on the second user interface of the second apparatus, and
wherein, upon receiving the second operation, the second controller controls the second communication interface to transmit second information to the first apparatus to permit the first apparatus to transmit the information to the second apparatus.

5. The communication system according to claim 4, wherein the second display includes the second user interface.

6. The communication system according to claim 1, wherein the specific operation comprises touching an image on a screen on the first apparatus.

7. The communication system according to claim 1, wherein the second notice prompts the user to operate a designated area of the first apparatus.

8. The communication system according to claim 7, wherein the second controller is configured to control the second display to display a number of times of tapping the designated area for permitting the first apparatus to transmit the information to the second apparatus.

9. The communication system according to claim 1, wherein the second controller is configured to display, based on a synchronization signal, the second notice at a timing synchronized with a timing at which the first apparatus displays the first notice.

10. The communication system according to claim 1, wherein the second apparatus further comprises a memory for storing, in advance of establishing the first wireless communication connection, display data for displaying the second notice.

11. The communication system according to claim 1, wherein the second controller is configured to determine whether to display the second notice.

12. The communication system according to claim 11, wherein the second apparatus further comprises:
a horizontal rotating shaft configured to rotatably support the second display with respect to the second apparatus; and
a sensor configured to detect a mounting angle of the second display relative to the second apparatus,
wherein the second controller is configured to determine whether the mounting angle of the second display is equal to or larger than a threshold value,
wherein the second controller controls the second display to display the second notice in response to a determination that the mounting angle of the second display is equal to or larger than the threshold value, and
wherein the second controller controls the second display to not display the second notice in response to a determination that the mounting angle of the second display is smaller than the threshold value.

13. The communication system according to claim 1, wherein the second apparatus further comprises:
a third communication interface configured to communicate with the first apparatus when the second apparatus is in the second wireless communication mode; and
a printing unit that prints an image on a sheet,
wherein the second controller is configured to receive, after establishing the second wireless communication connection with the first apparatus, print data from the first apparatus through the third communication interface, and
wherein the second controller is configured to control the printing unit to print an image based on the print data received through the third communication interface.

14. The communication system according to claim 1, wherein the second apparatus further comprises:
a third communication interface configured to communicate with the first apparatus when the second apparatus is in the second wireless communication mode, wherein the information received from the first apparatus is information for establishing communication with the first apparatus through the third communication interface.

\* \* \* \* \*